US009736421B2

(12) United States Patent
Iino et al.

(10) Patent No.: US 9,736,421 B2
(45) Date of Patent: Aug. 15, 2017

(54) INFORMATION REPRODUCTION SYSTEM, INFORMATION REPRODUCTION METHOD, INFORMATION REPRODUCTION DEVICE, AND ACCESS ANALYSIS DEVICE

(71) Applicant: MITSUBISHI ELECTRIC CORPORATION, Tokyo (JP)

(72) Inventors: Susumu Iino, Tokyo (JP); Kenji Esumi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 14/776,915

(22) PCT Filed: Mar. 14, 2014

(86) PCT No.: PCT/JP2014/056919
§ 371 (c)(1),
(2) Date: Sep. 15, 2015

(87) PCT Pub. No.: WO2014/171243
PCT Pub. Date: Oct. 23, 2014

(65) Prior Publication Data
US 2016/0028988 A1    Jan. 28, 2016

(30) Foreign Application Priority Data
Apr. 19, 2013   (JP) ................. 2013-087935

(51) Int. Cl.
*H04N 7/173*   (2011.01)
*H04N 5/765*   (2006.01)
(Continued)

(52) U.S. Cl.
CPC ............ *H04N 5/765* (2013.01); *G11B 20/10* (2013.01); *G11B 27/105* (2013.01); *H04N 5/76* (2013.01);
(Continued)

(58) Field of Classification Search
CPC ....... H04N 21/41422; H04N 21/43615; H04N 21/436; H04N 21/4147; H04N 21/6125;
(Continued)

(56) References Cited

U.S. PATENT DOCUMENTS 6,487,543 B1 * 11/2002 Ozaki .................... H04H 20/93
                                                    348/E7.061
2002/0078181 A1   6/2002 Treffers et al.
(Continued)

FOREIGN PATENT DOCUMENTS

CN    101719913 A   6/2010
CN    102486783 A   6/2012
(Continued)

*Primary Examiner* — Pankaj Kumar
*Assistant Examiner* — Reuben M Brown
(74) *Attorney, Agent, or Firm* — Birch, Stewart, Kolasch & Birch, LLP

(57) ABSTRACT

A system, a method, and a device that can reproduce a reproduction target file recorded on a portable information recording medium and a network file acquired in response to a request of a content application are provided. In the system including video reproduction devices, the vehicle-mounted video reproduction device transmits an NF entry transmission request, stores a received NF entry as an NF table, acquires in advance an NF on the basis of a stored NF entry and stores it, and if it is determined that an NF entry corresponding to a reproduction target file exists in the NF table when an optical disc is reproduced in a player unit, executes a proxy response for reading an NF identified by the NF entry corresponding to the reproduction target file from an NF storage unit and for supplying it to the player unit.

19 Claims, 24 Drawing Sheets

(51) Int. Cl.
  *G11B 20/10* (2006.01)
  *H04N 21/414* (2011.01)
  *H04N 21/436* (2011.01)
  *H04N 21/4363* (2011.01)
  *H04N 5/76* (2006.01)
  *H04N 9/82* (2006.01)
  *G11B 27/10* (2006.01)
  *H04N 21/4147* (2011.01)
  *H04N 21/61* (2011.01)
  *H04N 21/432* (2011.01)
  *H04N 21/472* (2011.01)
  *H04N 5/445* (2011.01)

(52) U.S. Cl.
  CPC ....... *H04N 9/8205* (2013.01); *H04N 21/4147* (2013.01); *H04N 21/41422* (2013.01); *H04N 21/4325* (2013.01); *H04N 21/4363* (2013.01); *H04N 21/43615* (2013.01); *H04N 21/47217* (2013.01); *H04N 21/6125* (2013.01); *H04N 21/6175* (2013.01)

(58) Field of Classification Search
  CPC ........... H04N 21/6175; H04N 21/4325; H04N 21/47217; H04N 5/765; H04N 5/76; H04N 9/8205; H04N 21/3385; H04N 21/2393; H04N 21/23439; H04N 21/25808; H04N 21/25891; G11B 27/105; G11B 20/10; G11B 27/10; A01B 12/006
  See application file for complete search history.

(56) References Cited

U.S. PATENT DOCUMENTS

| | | | |
|---|---|---|---|
| 2002/0194299 A1* | 12/2002 | Yasaki | H04N 5/4403 709/217 |
| 2004/0001697 A1 | 1/2004 | Kambayashi et al. | |
| 2006/0150228 A1* | 7/2006 | Kelly | G06F 17/30861 725/109 |
| 2006/0209174 A1* | 9/2006 | Isaac | H04N 21/41422 348/14.01 |
| 2008/0055058 A1* | 3/2008 | Nishiyama | G07C 5/008 340/438 |
| 2009/0252475 A1 | 10/2009 | Chiba et al. | |
| 2009/0257734 A1 | 10/2009 | Kimura et al. | |
| 2009/0282077 A1* | 11/2009 | Thomas | G06F 17/30038 |
| 2010/0129067 A1 | 5/2010 | Nagano | |
| 2013/0031192 A1* | 1/2013 | Caspi | H04L 65/1069 709/206 |
| 2016/0028988 A1* | 1/2016 | Iino | G11B 20/10 725/75 |
| 2016/0306715 A1* | 10/2016 | Kumarasamy | G06F 11/1469 |

FOREIGN PATENT DOCUMENTS

| | | |
|---|---|---|
| JP | 2004-88740 A | 3/2004 |
| JP | 2004-516602 A | 6/2004 |
| JP | 2009-111530 A | 5/2009 |
| JP | 2009-253724 A | 10/2009 |
| JP | 2009-253878 A | 10/2009 |
| JP | 5314915 B2 | 10/2013 |

* cited by examiner

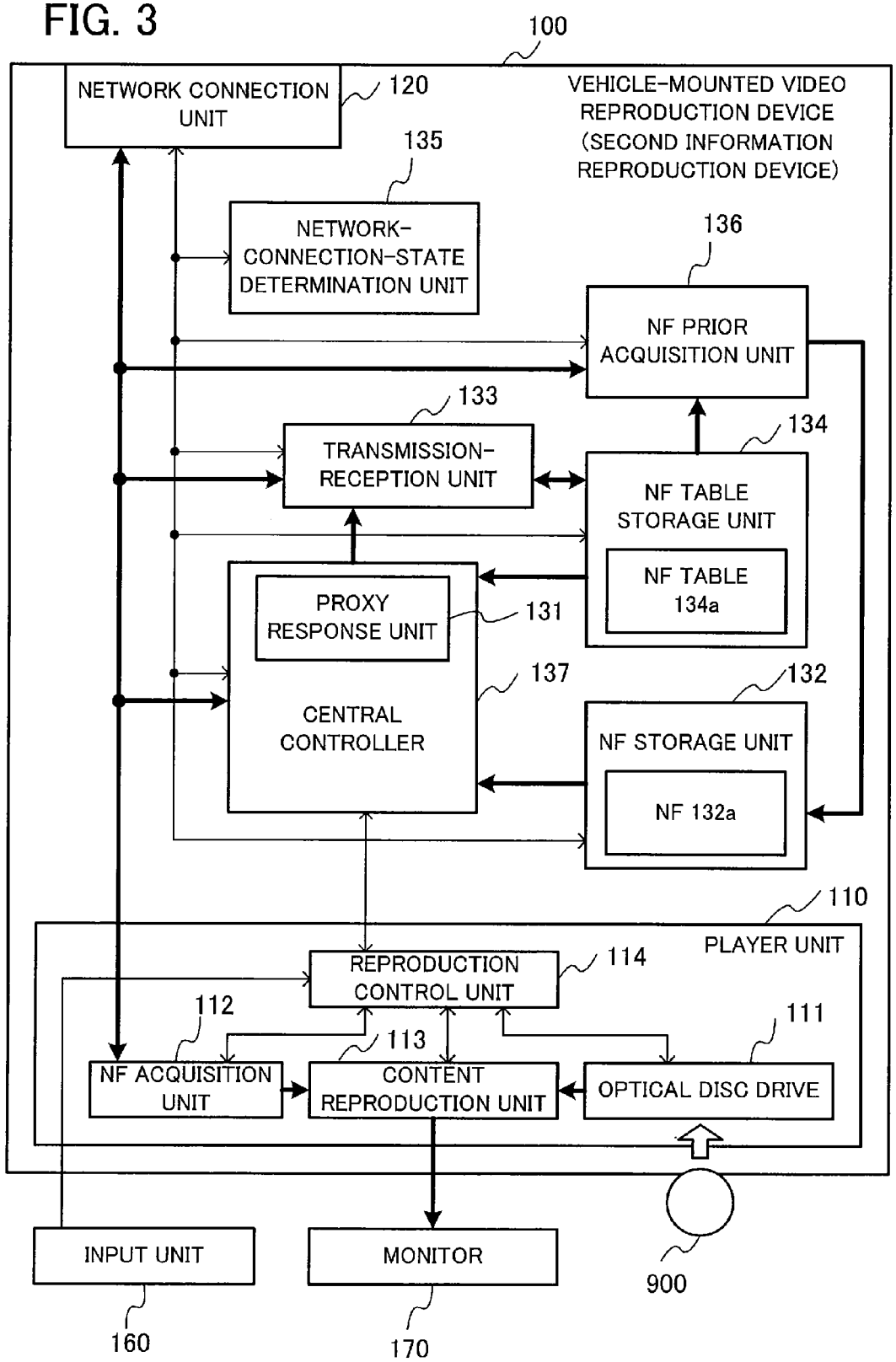

FIG. 4

NF TABLE

| ENT-RY ID | NETWORK FILE URL | FILE PATH IN NF STORAGE UNIT 132 | DATE AND TIME OF LAST UPDATE OF ORIGINAL FILE | DATE AND TIME OF ACQUISI-TION | FILE SIZE | ACQUISI-TION STATE |
|---|---|---|---|---|---|---|
| 01 | http://www.22cent.com/DiscID_00001/trailer/index.html | var/prxy/cache/www.22cent.com/DiscID_00001/trailer/index.html | 2012/01/30 | 2012/01/30 | 1KB | ACQUIRED |
| 02 | http://www.22cent.com/DiscID_00001/common/pack.xml | var/prxy/cache/www.22cent.com/DiscID_00001/common/layout.xml | 2011/01/01 | 2012/01/01 | 1KB | ACQUIRED |
| 03 | http://www.22cent.com/DiscID_00001/trailer/content1.png | var/prxy/cache/www.22cent.com/DiscID_00001/trailer/content1.png | 2012/01/01 | 2012/01/01 | 3.7KB | ACQUIRED |
| 04 | http://www.22cent.com/DiscID_00001/trailer/content2.png | var/prxy/cache/www.22cent.com/DiscID_00001/trailer/content2.png | 2012/01/30 | 2011/01/30 | 5.6KB | ACQUIRED |
| 05 | http://www.22cent.com/DiscID_00001/trailer/content3.png | var/prxy/cache/www.22cent.com/DiscID_00001/trailer/content3.png | 2012/01/30 | 2011/01/01 | 5.6KB | NOT UPDATED |
| 06 | http://www.22cent.com/DiscID_00001/trailer/content1.mt2s | var/prxy/cache/www.22cent.com/DiscID_00001/trailer/content1.mt2s | 2012/01/01 | 2012/01/01 | 20MB | ACQUIRED |
| 07 | http://www.22cent.com/DiscID_00001/trailer/content2.mt2s | var/prxy/cache/www.22cent.com/DiscID_00001/trailer/content2.mt2s | 2012/01/30 | 2011/01/30 | 22MB | NOT UPDATED |
| 08 | http://www.22cent.com/DiscID_00001/trailer/content3.mt2s | — | 2012/01/30 | — | 22MB | NOT ACQUIRED |
| 09 | http://www.disn.com/DiscID_02000/Appendix/pac.xml | var/prxy/cache/www.disn.com/DiscID_02000/Appendix/pac.xml | 2011/07/30 | — | 1KB | ACQUIRED |
| ... | ... | ... | ... | ... | ... | ... |

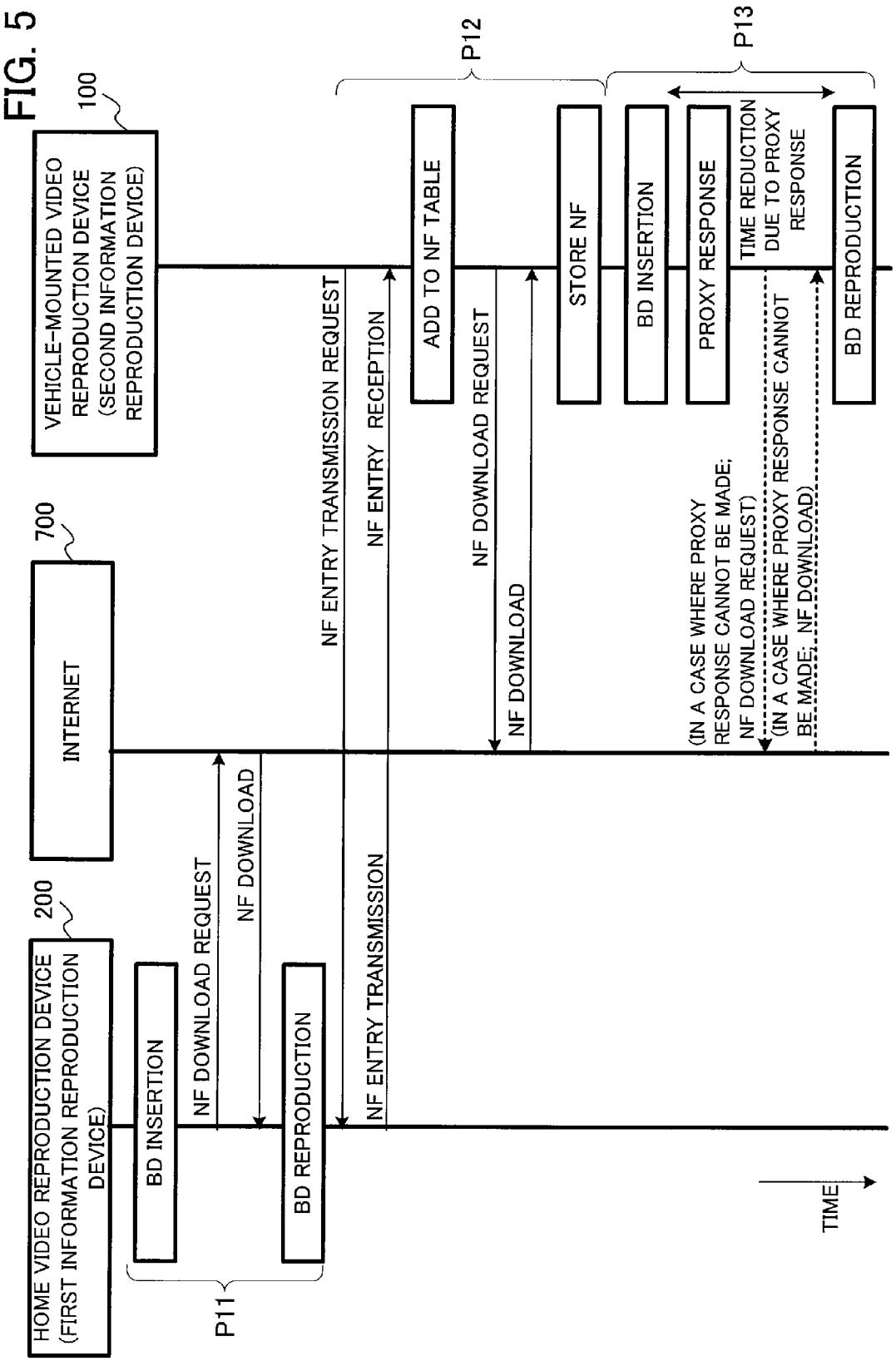

INFORMATION REPRODUCTION SYSTEM, INFORMATION REPRODUCTION METHOD, INFORMATION REPRODUCTION DEVICE, AND ACCESS ANALYSIS DEVICE

TECHNICAL FIELD

The present invention relates to an information reproduction system, an information reproduction method, an information reproduction device, and an access analysis device for reproducing a reproduction target file (main content) recorded on a portable information recording medium such as an optical disc and a network file (additional content) acquired in response to a request of a content application recorded on the portable information recording medium.

BACKGROUND ART

As vehicle-mounted equipment such as an RSE (Rear Seat Entertainment) system, a vehicle-mounted BD player, which is a video reproduction device that can reproduce a BD-ROM conforming to read-only standards of BD (Blu-ray Disc (registered trademark)), is used. The vehicle-mounted BD player can not only reproduce a reproduction target file (main content) recorded on a BD-ROM but also reproduce a network file (additional content) acquired via the Internet by executing a Java (registered trademark) program as a content application recorded on the BD-ROM, in association with (in synchronization with, for example) the main content.

However, the vehicle-mounted BD player makes connection to the Internet by wireless communication having a line speed slower than wired communication, and connection to the Internet tends to be interrupted while on the move, so that there is a possibility that a case where the downloading of a necessary network file via the Internet cannot be completed before a time when a Java (registered trademark) program recorded on the BD-ROM disc needs it occurs.

As a countermeasure against such a case, there is a proposal of a vehicle-mounted video reproduction device that, immediately after an optical disc is inserted, downloads and stores in advance by wireless communication all of the information that could be requested to be acquired from the Internet while the inserted optical disc is being reproduced (refer to patent reference 1, for example).

PRIOR ART REFERENCES

Patent Reference

Patent reference 1: Japanese patent application publication No. 2009-253878 (Abstract, FIG. 1, for example).

SUMMARY OF THE INVENTION

Problems to be Solved by the Invention

The vehicle-mounted video reproduction device described in patent reference 1, however, has a problem that it cannot acquire necessary information in advance via the Internet if it is in a state that connection to the Internet cannot be made when an optical disc is inserted or if it becomes unable to make connection to the Internet immediately after the optical disc is inserted.

Furthermore, the vehicle-mounted video reproduction device described in patent reference 1 has a problem that it frequently requires a long time from the insertion of an optical disc until the beginning of reproduction because the line speed in the Internet connection by wireless communication is slow, even if the vehicle-mounted video reproduction device is in a state that connection to the Internet can be made when the optical disc is inserted.

Therefore, the present invention has been made to solve the problems of the above-mentioned prior art, and its object is to provide an information reproduction system, an information reproduction method, an information reproduction device, and an access analysis device which make it possible to reproduce a reproduction target file recorded on a portable information recording medium and a network file acquired in response to a request of a content application, when the portable information recording medium is reproduced, and make it possible to start such reproduction quickly.

Means for Solving the Problem

An information reproduction system according to one aspect of the invention includes a first information reproduction device and a second information reproduction device that can communicate with each other. The first information reproduction device includes a first network connection unit for making connection to the Internet; a first player unit that reproduces a main content which is a reproduction target file recorded on a portable information recording medium and an additional content which is a network file acquired via the Internet; an access analyzer that extracts a network file entry as Internet connection destination information contained in an Internet connection request based on a content application recorded on the portable information recording medium, when the portable information recording medium is reproduced in the first player unit; a network-file entry storage unit that stores the network file entry extracted by the access analyzer; a first transmission-reception unit that transmits information through the first network connection unit; and a first central controller that causes to transmit the network file entry stored in the network-file entry storage unit, to the first transmission-reception unit, when a network-file entry transmission request is received. The second information reproduction device includes a second network connection unit for making connection to the Internet; a second player unit that reproduces a main content which is a reproduction target file recorded on the portable information recording medium, and an additional content which is a network file acquired via the Internet; a second transmission-reception unit that transmits and receives information through the second network connection unit; a network-file table storage unit that stores the network file entry as a network file table; a second central controller that controls a process of causing the second transmission-reception unit to transmit the network-file entry transmission request to the first information reproduction device and a process of causing to update the network file table by using the network file entry transmitted from the first information reproduction device; a network-file storage unit that stores a network file; and a network-file prior acquisition unit that acquires the network file via the Internet through the second network connection unit, on a basis of the network file entry stored as the network file table and causes the network-file storage unit to store the acquired network file. If it is determined that a network file entry included in an Internet connection request based on a content application recorded on the portable information recording medium exists in the network file table when the portable information recording medium is reproduced in the second player unit, the second central controller reads a network file identified by the network file entry which is determined to exit in the network file table, from the network-file storage unit, and supplies the network file to the second player unit.

An information reproduction method according to another aspect of the invention is executed by a system including a first information reproduction device and a second information reproduction device that can communicate with each other, wherein each of the first information reproduction device and the second information reproduction device includes a first player unit and a second player unit that reproduce a main content of a reproduction target file recorded on a portable information recording medium and an additional content of a network file acquired via the Internet. The information reproduction method includes the steps of: causing a network-file entry storage unit to store a network file entry as Internet connection destination information contained in an Internet connection request based on a content application recorded on the portable information recording medium, when the portable information recording medium is reproduced in the first information reproduction device; transmitting a network-file entry transmission request from the second information reproduction device to the first information reproduction device; transmitting the network file entry stored in the network-file entry storage unit, from the first information reproduction device which has received the network-file entry transmission request, to the second information reproduction device; in the second information reproduction device which has received the network file entry, causing a network-file table storage unit to store the received network file entry as a network file table; in the second information reproduction device, acquiring a network file via the Internet on a basis of the network file entry stored in the network-file table storage unit and causing a network-file storage unit to store the acquired network file; and if it is determined that a network file entry corresponding to a reproduction target file recorded on the portable information recording medium exists in the network file table when the portable information recording medium is reproduced in the second player unit, executing a proxy response for reading a network file identified by the network file entry corresponding to the reproduction target file from the network file storage unit, and for supplying the network file to the second player unit.

An information reproduction device according to yet another aspect of the invention can communicate with another information reproduction device. The information reproduction device includes a player unit that reproduces a main content which is a reproduction target file recorded on a portable information recording medium and an additional content which is a network file acquired via the Internet; a network connection unit for making connection to the Internet; a transmission-reception unit that transmits the network-file entry transmission request through the network connection unit to the another information reproduction device; a network-file table storage unit that stores a network file entry as a network file table; a central controller that controls a process of causing the transmission-reception unit to transmit the network-file entry transmission request to the another information reproduction device and a process of, when the transmission-reception unit receives the network file entry, causing to update the network file table by using the received network file entry; a network-file storage unit that stores a network file; and a network-file prior acquisition unit that acquires the network file on a basis of the network file entry stored in the network-file table storage unit, via the Internet through the network connection unit, and causes the network-file storage unit to store the acquired network file. The central controller includes a proxy response unit that, if it is determined that a network file entry corresponding to a reproduction target file recorded on the portable information recording medium exists in the network file table when the portable information recording medium is reproduced in the player unit, reads a network file identified by the network file entry corresponding to the reproduction target file from the network-file storage unit, and supplies the network file to the player unit.

An information reproduction system according to still another aspect of the invention includes a first information reproduction device, an access analysis device, and a second information reproduction device that can communicate with each other. The first information reproduction device includes a first network connection unit for making connection to the Internet through the access analysis device; a network-file acquisition unit for acquiring a file via the Internet through the first network connection unit; and a reproduction control unit that reproduces a main content which is a reproduction target file recorded on a portable information recording medium and an additional content which is a network file acquired via the Internet. The access analysis device includes an internal network connection unit that accepts an Internet connection from the first information reproduction device; an external network connection unit for making connection to the Internet; an access analyzer that analyzes an Internet connection request and extracts a network file entry as Internet connection destination information contained in the Internet connection request; a network-file entry storage unit that stores the network file entry extracted by the access analyzer; a first transmission-reception unit that transmits information through the external network connection unit; and a first central controller that, when a network-file entry transmission request is received, causes the first transmission-reception unit to transmit the network file entry stored in the network-file entry storage unit. The second information reproduction device includes a second network connection unit for making connection to the Internet; a second player unit that reproduces a main content which is a reproduction target file recorded on the portable information recording medium and an additional content which is a network file acquired via the Internet; a second transmission-reception unit that transmits and receives information through the second network connection unit; a network-file table storage unit that stores the network file entry as a network file table; a second central controller that controls a process of causing the second transmission-reception unit to transmit the network-file entry transmission request to the first information reproduction device and a process of causing to update the network file table by using the network file entry transmitted from the first information reproduction device; a network-file storage unit that stores a network file; and a network-file prior acquisition unit that acquires the network file via the Internet through the second network connection unit, on a basis of the network file entry stored as the network file table, and causes the network-file storage unit to store the acquired network file. If it is determined that a network file entry included in an Internet connection request based on a content application recorded on the portable information recording medium exists in the network file table when the portable information recording medium is reproduced in the second player unit, the second central controller reads a network file identified by the network file entry which is determined to exist in the network file table, from the network-file storage unit, and supplies the network file to the second player unit.

Effects of the Invention

According to the present invention, since an additional content that should be acquired via the Internet in response to a request of a content application recorded on a portable information recording medium is acquired and stored in a storage unit in advance, it is possible to reproduce a reproduction target file recorded on the portable information recording medium and a network file acquired in response to a request of the content application when the portable information recording medium is reproduced, and it is possible to start such reproduction quickly.

BRIEF DESCRIPTION OF THE DRAWINGS

FIG. 3 is a block diagram schematically showing the configuration of a vehicle-mounted video reproduction device (second information reproduction device) according to the first embodiment.

FIG. 4 is a diagram showing an example of a network file table (NF table) and network file entries (NF entries) handled by the vehicle-mounted video reproduction device (second information reproduction device) according to the first embodiment.

FIG. 5 is a sequence diagram schematically showing operation of the video reproduction system (information reproduction system) and an information reproduction method according to the first embodiment.

MODE FOR CARRYING OUT THE INVENTION

<1> First Embodiment

<1-1> Configuration of First Embodiment

Figure 1:
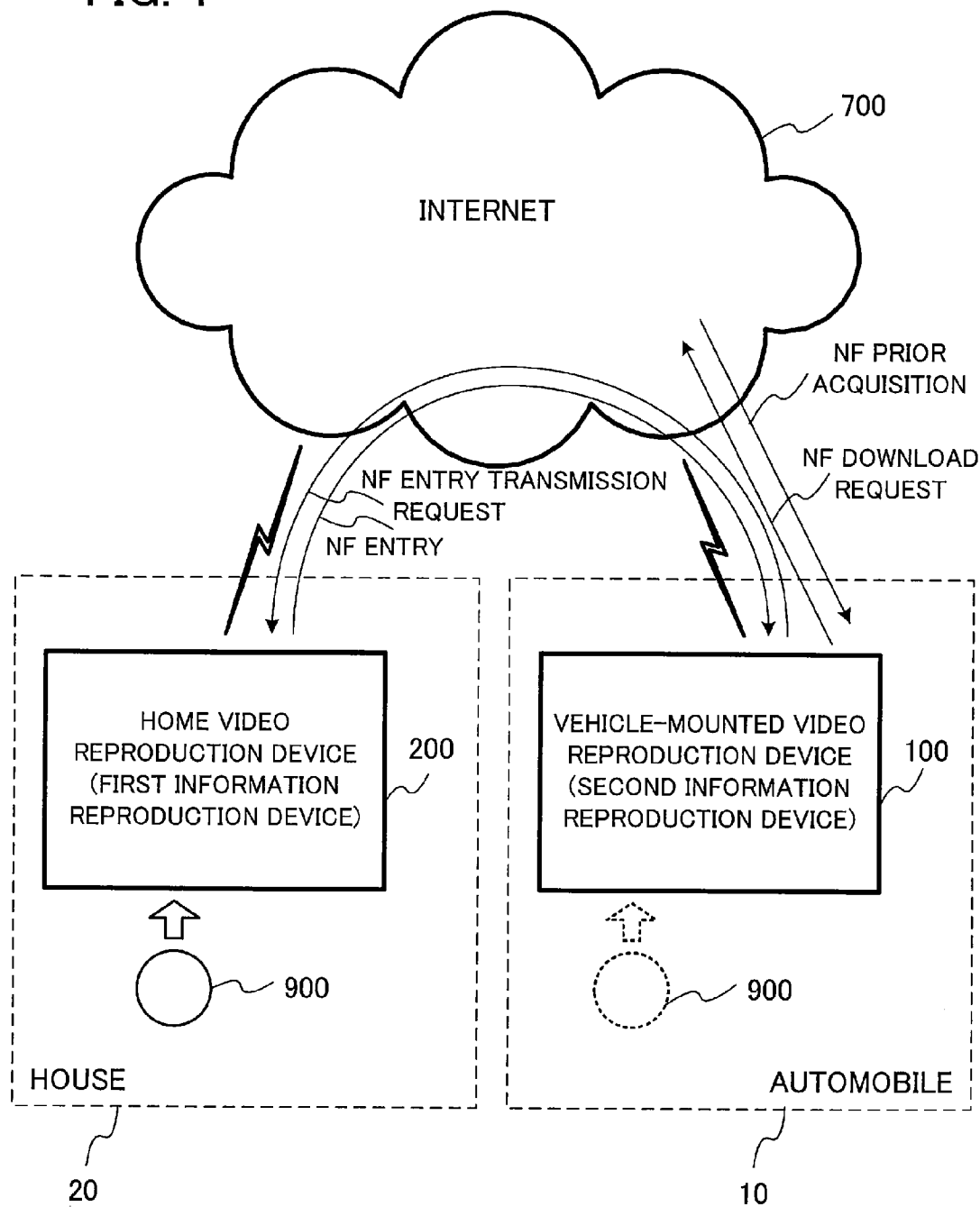
FIG. 1 is a diagram schematically showing the configuration of a video reproduction system (information reproduction system) according to a first embodiment of the present invention.

FIG. 1 is a diagram schematically showing the configuration of a video reproduction system (information reproduction system) according to a first embodiment of the present invention. As shown in FIG. 1, the video reproduction system (information reproduction system) according to the first embodiment includes a home video reproduction device (first information reproduction device) 200 and a vehicle-mounted video reproduction device (second information reproduction device) 100, which can communicate with each other via the Internet 700 as a network. The home video reproduction device 200 is, for example, a device that is set up in a house 20, is not used while on the move, can communicate with the Internet 700 by wire or by radio, and can reproduce an optical disc (e.g., a BD, a DVD, a CD, a BD-ROM conforming to a BDMV standard, and the like) 900 as a portable information recording medium. The vehicle-mounted video reproduction device 100 is, for example, a device that is set up in an automobile 10, can be also used while on the move, can communicate with the Internet 700 by radio, and can reproduce an optical disc (e.g., a BD, a DVD, a CD, a BD-ROM conforming to a BDMV standard, and the like) 900 as a portable information recording medium. The portable information recording medium may also be another information recording medium such as a magnetic disc and a semiconductor memory if it can be attached to (inserted into) and detached from (pulled out of) the information reproduction device. Furthermore, the place of installation of the first information reproduction device represented by the home video reproduction device 200 is not limited to an indoor location. The place of installation of the second information reproduction device represented by the vehicle-mounted video reproduction device 100 is not limited to an automobile, and the device may be an information reproduction device that is designed to be carried around by the user or an information reproduction device that is set up in other mobile entities (e.g., a ship, a bicycle and the like).

Figure 2:
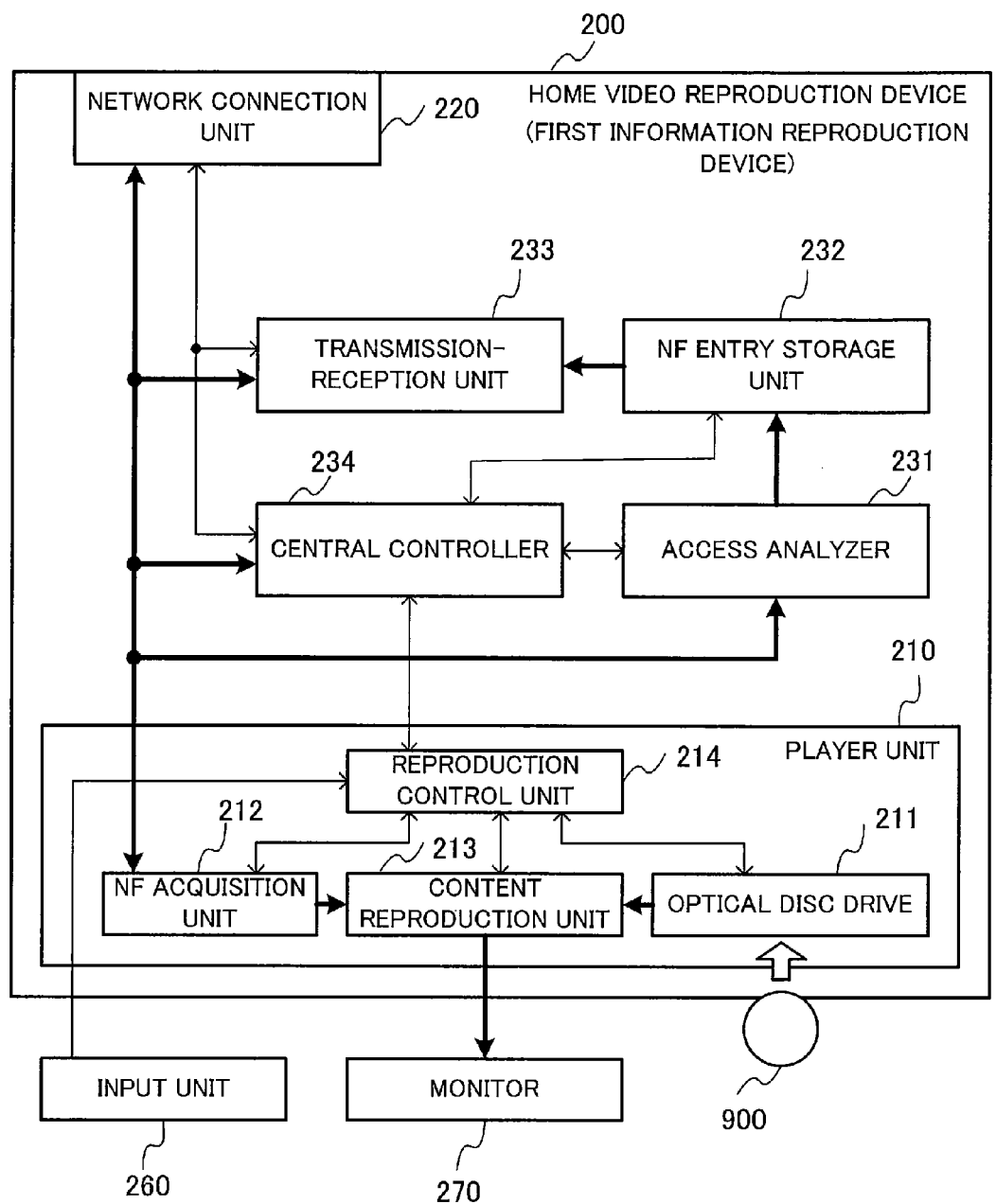
FIG. 2 is a block diagram schematically showing the configuration of a home video reproduction device (first information reproduction device) according to the first embodiment.

FIG. 2 is a block diagram schematically showing the configuration of the home video reproduction device (first information reproduction device) 200 according to the first embodiment. As shown in FIG. 2, the home video reproduction device (first information reproduction device) 200 includes a network connection unit (first network connection unit) 220 for making connection to the Internet 700, a player unit (first player unit) 210 for reproducing a main content which is a reproduction target file recorded on the optical disc 900 and an additional content which is a network file acquired via the Internet 700, an access analyzer 231 for extracting a network file entry (NF entry) as Internet connection destination information contained in an Internet connection request based on a content application recorded on the optical disc 900 when the optical disc 900 is reproduced in the player unit 210, an NF entry storage unit 232 for storing the NF entry extracted by the access analyzer 231, a transmission: reception unit (first transmission-reception unit) 233 for transmitting information through the network connection unit 220, and a central controller (first central controller) 234 for causing the transmission-reception unit 233 to transmit the network file entry stored in the NF entry storage unit 232 when an NF entry transmission request is received. Furthermore, the player unit 210 includes an optical disc drive 211, a network-file (NF) acquisition unit 212, a content reproduction unit 213 for reproducing a reproduction target file (main content) recorded on the optical disc 900 and/or a network file (additional content) acquired (downloaded) via the Internet 700 separately and/or in association with each other (for example, by overlaying one on another concurrently or by placing them side by side concurrently), and a reproduction control unit 214 for controlling the whole of the player unit 210. In FIG. 2, reference character 260 denotes an input unit (e.g., a remote controller or an operation button on the main body of the device) by which user input is performed, and reference character 270 denotes a monitor for displaying an image based on a video signal output from the player unit 210. Like a television set equipped with a video reproduction device or a personal computer or the like, the home video reproduction device 200 may integrally include the monitor 270.

Next, the components of the home video reproduction device 200 in FIG. 2 will be described in detail. The player unit 210 performs reproduction of the optical disc 900. If a content application on the optical disc 900 requests acquisition of a network file, an NF acquisition request is sent to the network connection unit 220 and at this time the NF acquisition request is also given to the access analyzer 231.

The network connection unit 220 receives the NF acquisition request from the player unit 210 and then acquires a network file from the Internet 700. In the first embodiment, the network connection unit 220 is connected to the Internet by wired communication, but wireless communication may also be used.

When the player unit 210 makes an Internet connection request, the access analyzer 231 analyzes the content of the request, obtains a URL of a network file (NF) to generate an NF entry if the content of the request is an NF acquisition request, and stores it in the NF entry storage unit 232.

The NF entry storage unit 232 stores the NF entry generated by the access analyzer 231, and if there is a request from the transmission-reception unit 233 as a network-file (NF) URL transmission unit, gives the stored NF entry to the transmission-reception unit 233.

If an NF entry transmission request is received from the vehicle-mounted video reproduction device 100, the transmission-reception unit 233 obtains an NF entry from the NF entry storage unit 232 and transmits it through the network connection unit 220 to the vehicle-mounted video reproduction device 100.

The NF entry in the present application is a single unit of information, for a single network file (NF), containing the items of the said network file: "network file URL", "file path in the NF storage unit 132", "date and time of last update of original file", "date and time of acquisition", "file size", and "acquisition state". An NF table 134a (NFT) is a unit of information listing a plurality of NF entries each having an assigned ID.

Here, the "date and time of acquisition" is an item where the date and time at which the said network file is stored in the NF storage unit 132 is stored. If the said network file is not stored in the NF storage unit 132, a symbol indicating that the said network file has not yet been acquired is stored.

The "acquisition state" item of the NF entry is a symbol indicating that the state of the network file corresponding to the NF entry is any of the following three states:
(1) Storage (acquisition) from the Internet 700 to the NF storage unit 132 has not been completed (corresponding to "not acquired" in FIG. 4);
(2) Storage (acquisition) from the Internet 700 to the NF storage unit 132 has been completed, and the acquired network file is identical to the file currently existing on the Internet 700 (corresponding to "acquired" in FIG. 4); and
(3) Storage (acquisition) from the Internet 700 to the NF storage unit 132 has been completed, but the acquired network file is older than that currently provided on the Internet 700 (corresponding to "not updated" in FIG. 4).

FIG. 3 is a block diagram schematically showing the configuration of the vehicle-mounted video reproduction device (second information reproduction device) 100 according to the first embodiment. Furthermore, FIG. 4 is a diagram showing an example of a network file table (NF table) 134a and network file entries (NF entries) stored in the NF table storage unit 134 of the vehicle-mounted video reproduction device (second information reproduction device) 100 according to the first embodiment. As shown in FIG. 3, the vehicle-mounted video reproduction device (second information reproduction device) 100 includes a player unit (second player unit) 110 for reproducing a main content which is a reproduction target file recorded on the optical disc 900 as a portable information recording medium and an additional content which is a network file acquired via the Internet 700, a network connection unit (second network connection unit) 120 for making connection to the Internet, a transmission-reception unit 133 for transmitting and receiving information through the second network connection unit 120, an NF table storage unit 134 for storing NF entries as an NF table 134a, a central controller (second central controller) 137 for controlling a process of causing the transmission-reception unit 133 to transmit an NF entry transmission request to the home video reproduction device 200 and a process of, when the transmission-reception unit 133 receives an NF entry, causing to update the NF table 134a by using the received NF entry, an NF storage unit 132 for storing a network file (NF), and an NF prior acquisition unit 136 for acquiring an NF on a basis of the NF entry stored in the NF table storage unit 134, via the Internet 700 through the network connection unit 120 and causes the NF storage unit 132 to store the acquired NF. Furthermore, the player unit 110 includes an optical disc drive 111, a network file (NF) acquisition unit 112, a content reproduction unit 113 for reproducing a reproduction target file (main content) recorded on the optical disc 900 and/or a network file (additional content) acquired (downloaded) via the Internet 700 separately and/or in association with each other (for example, by overlaying one on another concurrently or by placing them side by side concurrently), and a reproduction control unit 114 for controlling the whole of the player unit 110. In FIG. 3, reference character 160 denotes an input unit by which user input is made, and reference character 170 denotes a monitor for displaying images based on a video signal output from the player unit 110. Like a television set equipped with a video reproduction device or a personal computer or the like, the vehicle-mounted video reproduction device 100 may integrally include the monitor 170.

The central controller 137 includes a proxy response unit 131 that, if it is determined that an NF entry corresponding to a reproduction target file recorded on the optical disc 900 exists in the NF table 134a when the optical disc 900 is reproduced in the player unit 110, reads an NF identified by the NF entry corresponding to the reproduction target file from the NF storage unit 132, and supplies it to the player unit 110. If it is determined that an NF entry corresponding to a reproduction target file recorded on the optical disc 900 does not exist in the NF table 134a when the optical disc 900 is reproduced in the player unit 110, the central controller 137 acquires via the Internet 700 a network file identified by the NF entry included in an Internet connection request based on a content application recorded on the optical disc 900, and supplies it to the player unit 110.

The player unit 110 reads from the optical disc 900 information (content) recorded on the optical disc 900 and performs reproduction of the optical disc 900 in accordance with a reproduction control instruction recorded on the optical disc 900 and a reproduction control instruction input from the input unit 160. Here, "reproduction" is the operation of reading each of a still image, a moving image, and sound recorded on the optical disc 900 from the optical disc 900, decoding each of them if it is recorded in compressed form, superimposing them in a determined order, and outputting them to the monitor 170. Furthermore, if the reproduction control instruction is described as a Java program or the like and this Java program makes an instruction to acquire information from the Internet 700, the central controller 137 makes an information acquisition request to the network connection unit 120 and the proxy response unit 131.

In the present application, explanation will be made about the case where reproduction control is described as a Java program on the optical disc 900. The Java program is an example of content applications. Furthermore, information, acquisition of which is requested by the player unit 110 from the Internet 700 in accordance with instructions of a content application, is the network file (NF).

The network connection unit 120 is a component for making connection to a network outside the vehicle-mounted video reproduction device 100 and, in the vehicle-mounted video reproduction device 100, it performs transmission and reception of information in response to a transmission-reception request of information with an external network from each of the player unit 110, the central controller 137 including the proxy response unit 131, the transmission-reception unit 133, and the network file (NF) prior acquisition unit 136, and supplies the received information to each request source. The network connection unit 120 is, for example, a mobile phone terminal which can be directly connected to the Internet 700 or a terminal which enables wireless communication, such as a wireless LAN terminal. The external network is the Internet 700 or a local area network (e.g., a network 710 in FIG. 11 which will be described later and the like) connected to the Internet 700.

When the proxy response unit 131 receives the information acquisition request R110 from the player unit 110 and if it refers to the NF table 134a stored in the NF table storage unit 134 and the network-file (NF) storage unit 132 and a network file corresponding to an information acquisition request R110 received from the player unit 110 exists in the NF storage unit 132, it transmits the network file corresponding to the information acquisition request R110 form the NF storage unit 132 to the player unit 110. If the network file corresponding to the information acquisition request does not exist in the NF storage unit 132, an NF acquisition request is made to the network connection unit 120.

The NF storage unit 132 stores network files acquired by the NF prior acquisition unit 136, and transmits a network file through the proxy response unit 131 to the player unit 110 when there is an acquisition request of the network file from the proxy response unit 131.

The transmission-reception unit 133 transmits an NF entry acquisition request R133 to the home video reproduction device 200, receives an NF entry E200 from the home video reproduction device 200, and additionally stores the received NF entry E200 in the NF table 134a stored in the NF table storage unit 134.

The NF table storage unit 134 stores the NF table 134a in which the NF entry E200 has been additionally stored by the transmission-reception unit 133. The NF table 134a is referred to in response to requests from the proxy response unit 131, transmission-reception unit 133, and NF prior acquisition unit 136.

The network-connection-state determination unit 135 acquires network-connection-state determination information, which indicates whether or not the network connection unit 120 is currently connected to the Internet 700, from the network connection unit 120, and supplies this network-connection-state determination information to the proxy response unit 131, transmission-reception unit 133, and NF prior acquisition unit 136 in response to the requests.

The NF prior acquisition unit 136 refers to the NF table 134a in the NF table storage unit 134, acquires an unacquired network file if it exits, through the network connection unit 120 from the Internet 700, and stores it in the NF storage unit 132.

FIG. 4 is a diagram showing an example of the network file table (NF table) and network file entries (NF entries) handled by the vehicle-mounted video reproduction device (second information reproduction device) 100 according to the first embodiment. The table shown in FIG. 4 is an example of the NF table 134*a* described above. The whole table corresponds to the NF table 134*a*, and each row in the table corresponds to an NF entry. As shown in FIG. 4, in a case where the information which contains, for a single network file (NF), items of "network file URL", "file path in the NF storage unit 132", "date and time of last update of original file", "date and time of acquisition", "file size", and "acquisition state" of the said network file, is regarded as a single unit, the NF table 134*a* is a unit of information listing a plurality of NF entries each having an assigned ID.

<1-2> Operation of First Embodiment

FIG. 5 is a sequence diagram schematically showing the operation of the video reproduction system (information reproduction system) and an information reproduction method according to the first embodiment. As shown in FIG. 5, the video reproduction system according to the first embodiment is a system that includes the home video reproduction device 200 as the first information reproduction device and the vehicle-mounted video reproduction device 100 as the second information reproduction device, which can communicate with each other. The method of communication between the home Video reproduction device 200 and the vehicle-mounted video reproduction device 100 is not limited, but each of the home video reproduction device 200 and the vehicle-mounted video reproduction device 100 holds in advance information for identifying a device to be a communication partner. Furthermore, the number of the video reproduction devices that configure the video reproduction system is not limited to two and may be three or more. In FIG. 5, P11 denotes a reproduction process of a BD (an example of an optical disc) as a portable information recording medium by the home video reproduction device 200, P12 denotes a preparation process before the beginning of reproduction by the vehicle-mounted video reproduction device 100, and P13 denotes a reproduction process of a BD by the vehicle-mounted video reproduction device 100.

As shown in process P11 of FIG. 5, when the home video reproduction device 200 reproduces the BD as the optical disc 900, after the BD is inserted, the home video reproduction device 200 stores an NF entry in the NF entry storage unit 232 (FIG. 2), transmits a download request of a network file (NF) to the Internet 700 in accordance with a download request by a content application (e.g., a Java (registered trademark) program) recorded on the BD, and downloads the network file from a server of a content provider on the Internet 700. After the downloading of the network file is completed, the home video reproduction device 200 reproduces the main content which is reproduction target data recorded on the BD and the additional content contained in the downloaded network file while they are being associated (synchronized, for example) with each other, and outputs a reproduction signal to the monitor.

As shown in process P12 of FIG. 5, in the preparation process before the beginning of reproduction by the vehicle-mounted video reproduction device 100, the vehicle-mounted video reproduction device 100 transmits an NF entry transmission request to the home video reproduction device 200, and the home video reproduction device 200 that has received the NF entry transmission request transmits an NF entry to the vehicle-mounted video reproduction device 100. The vehicle-mounted video reproduction device 100 that has received the NF entry updates the NF table by using the received NF entry (adds the NF entry, for example). Thereafter, the vehicle-mounted video reproduction device 100 transmits a download request of a network file (NF) to the Internet 700, downloads the network file via the Internet 700, and stores it in the NF storage unit.

As shown in process P13 of FIG. 5, when the vehicle-mounted video reproduction device 100 reproduces the BD as the optical disc 900 after the BD is inserted, the vehicle-mounted video reproduction device 100 makes a download request of a network file (NF) in accordance with a download request by a content application recorded on the BD, but the requested network file exists in the NF storage unit 132, uses the network file stored in the NF storage unit 132 for reproduction (proxy response by the proxy response unit 131). If the requested network file does not exist in the NF storage unit 132, a proxy response cannot be made, and therefore a network file is downloaded via the Internet 700. After the proxy response is made or after the downloading of the network file is completed, the vehicle-mounted video reproduction device 100 reproduces the main content which is reproduction target data recorded on the BD and the additional content included in the downloaded network file while they are being associated (synchronized, for example) with each other, and outputs a reproduction signal to the monitor. In a case where the proxy response is made, time needed from the insertion of the BD until the beginning of the reproduction of the BD can be reduced.

In the first embodiment, explanation will be made about the case where the home video reproduction device 200 and the vehicle-mounted video reproduction device 100 are each connected directly to the Internet 700 and can communicate with each other via the Internet 700 (the case of FIG. 1), or about the case where the home video reproduction device 200 and the vehicle-mounted video reproduction device 100 are connected to the same local network (e.g., a LAN), can communicate with each other and can communicate with the Internet 700 through the local network (the case of FIG. 11 which will be described later).

Figure 6:
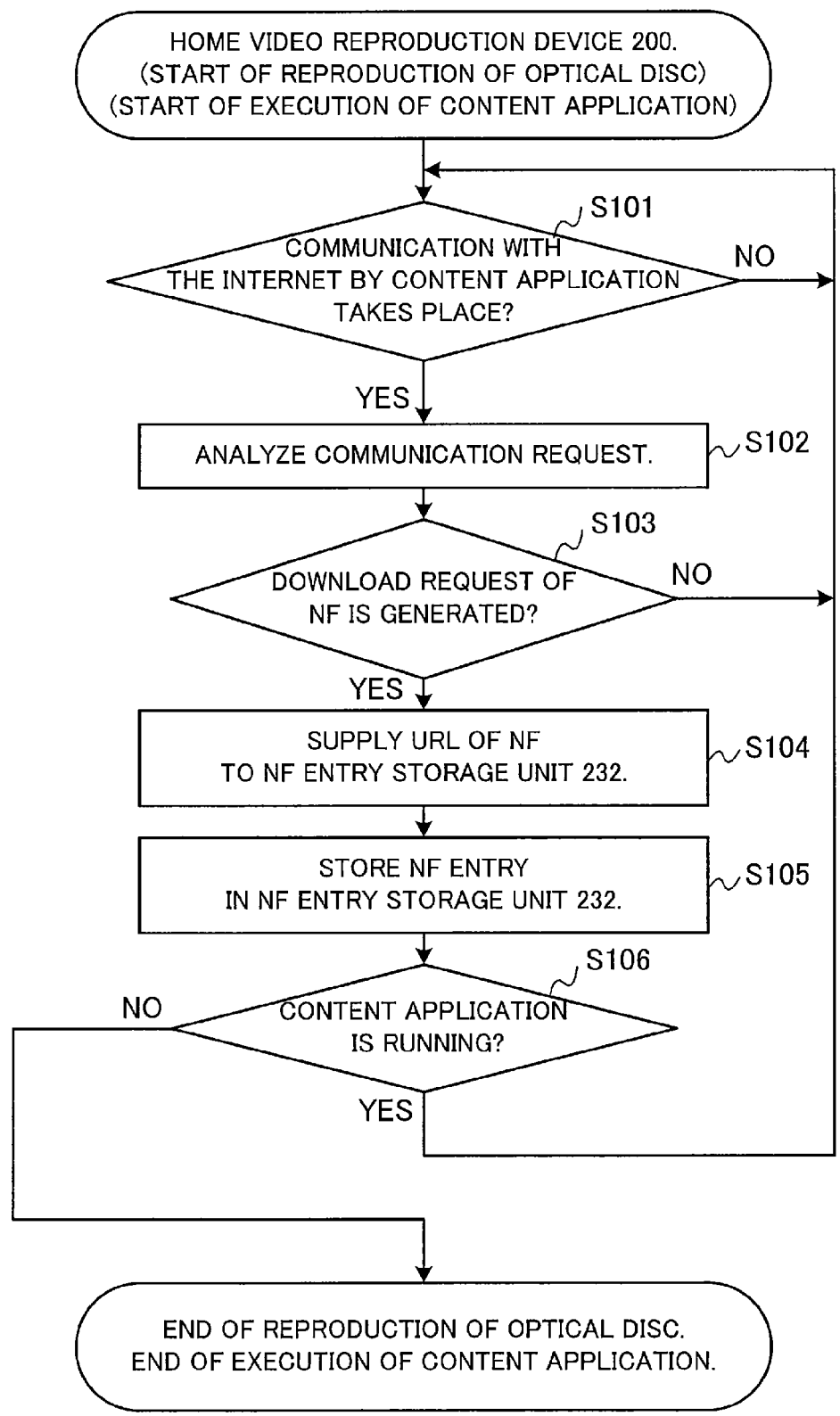
FIG. 6 is a flowchart showing processes of acquiring an NF entry in the home video reproduction device (first information reproduction device) according to the first embodiment.

FIG. 6 is a flowchart showing processes of acquiring an NF entry in the home video reproduction device (first information reproduction device) 200 according to the first embodiment. In FIG. 6, if a content application contained in the optical disc 900 makes a communication request with the Internet 700 while the content application is running (step S101), the communication request is given from the player unit 210 to the network connection unit 220, and communication is performed in accordance with the request of the content application. At the same time, the communication request is also given to the access analyzer 231 from the player unit 210, and the content of the communication request is analyzed by the access analyzer 231 (step S102).

If the result of analysis of the access analyzer 231 indicates that the content of the communication request is a download request of a network file (step S103), the URL of the network file is extracted from the content of the communication request to be given to the NF entry storage unit 232 (step S105). The NF entry storage unit 232 generates an NF entry by adding only a provisional entry ID to the given URL of the network file and stores it in the NF entry storage unit 232. This is repeated until the reproduction of the optical disc 900 ends (step S106). The provisional entry ID is an ID that is assigned to identify each entry in the NF entry storage unit 232, and is not used in the vehicle-mounted video reproduction device 100.

Figure 7:
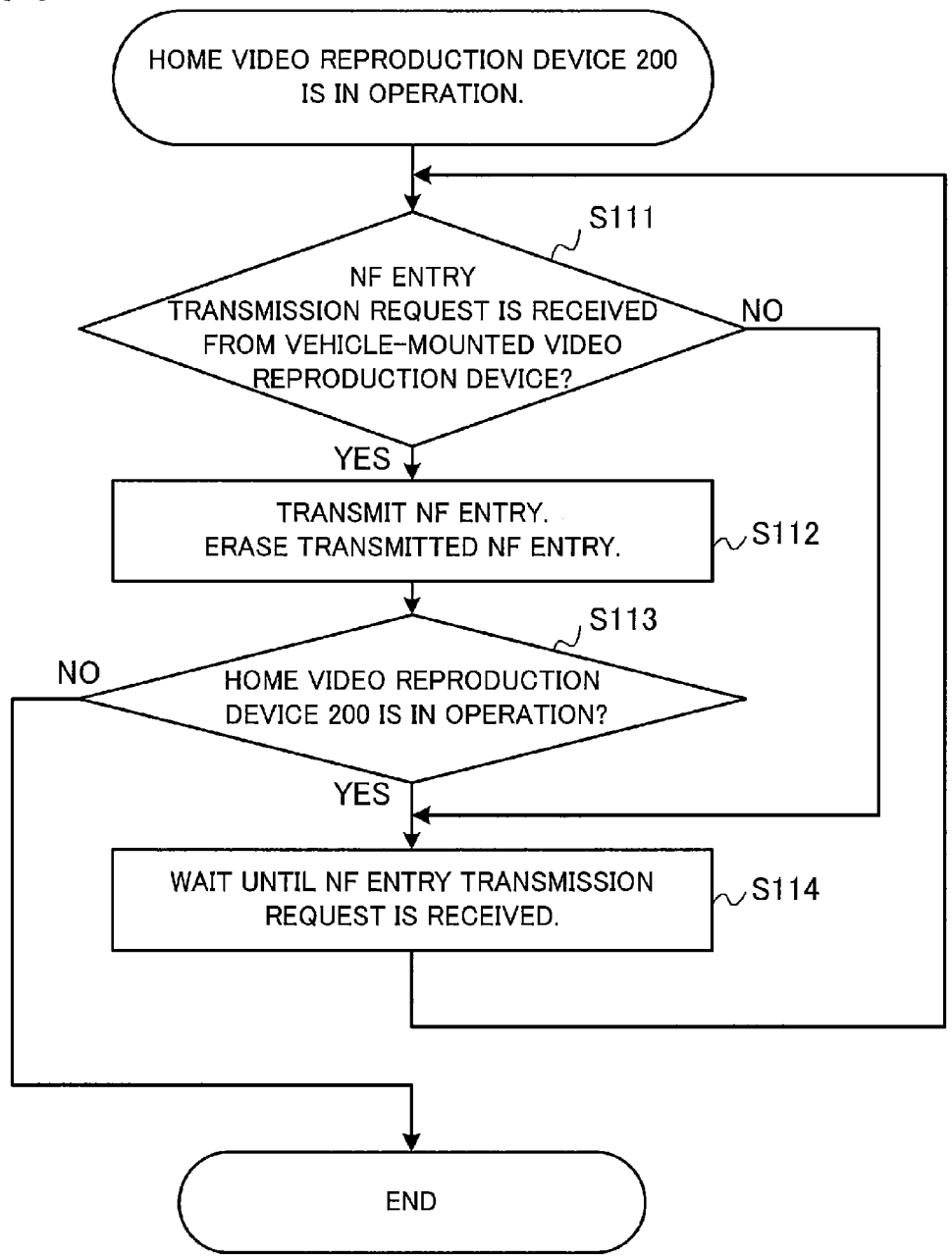
FIG. 7 is a flowchart showing processes of transmitting an NF entry to the vehicle-mounted video reproduction device (second information reproduction device), in the home video reproduction device (first information reproduction device) according to the first embodiment.

FIG. 7 is a flowchart showing processes in which the NF entry is transmitted to the vehicle-mounted video reproduction device (second information reproduction device 100), in the home video reproduction device (first information reproduction device) 200 according to the first embodiment. In FIG. 7, when the transmission-reception unit 233 of the home video reproduction device 200 receives a network-file URL transmission request (NF entry transmission request) from the vehicle-mounted video reproduction device 100 (step S111), the transmission-reception unit 233 transmits all of the URLs contained in the NF entry stored in the NF entry storage unit 232 through the network connection unit 220 to the vehicle-mounted video reproduction device 100. The NF entry, transmission of which is completed, is erased from the NF entry storage unit 202 (step S112). If the home video reproduction device 200 is in operation (step S113), it waits until the transmission-reception unit 233 receives a new network-file URL transmission request (NF entry transmission request) (step S114). The processes from step S111 to step S114 are repeated as long as the home video reproduction device 200 is in operation.

Figure 8:
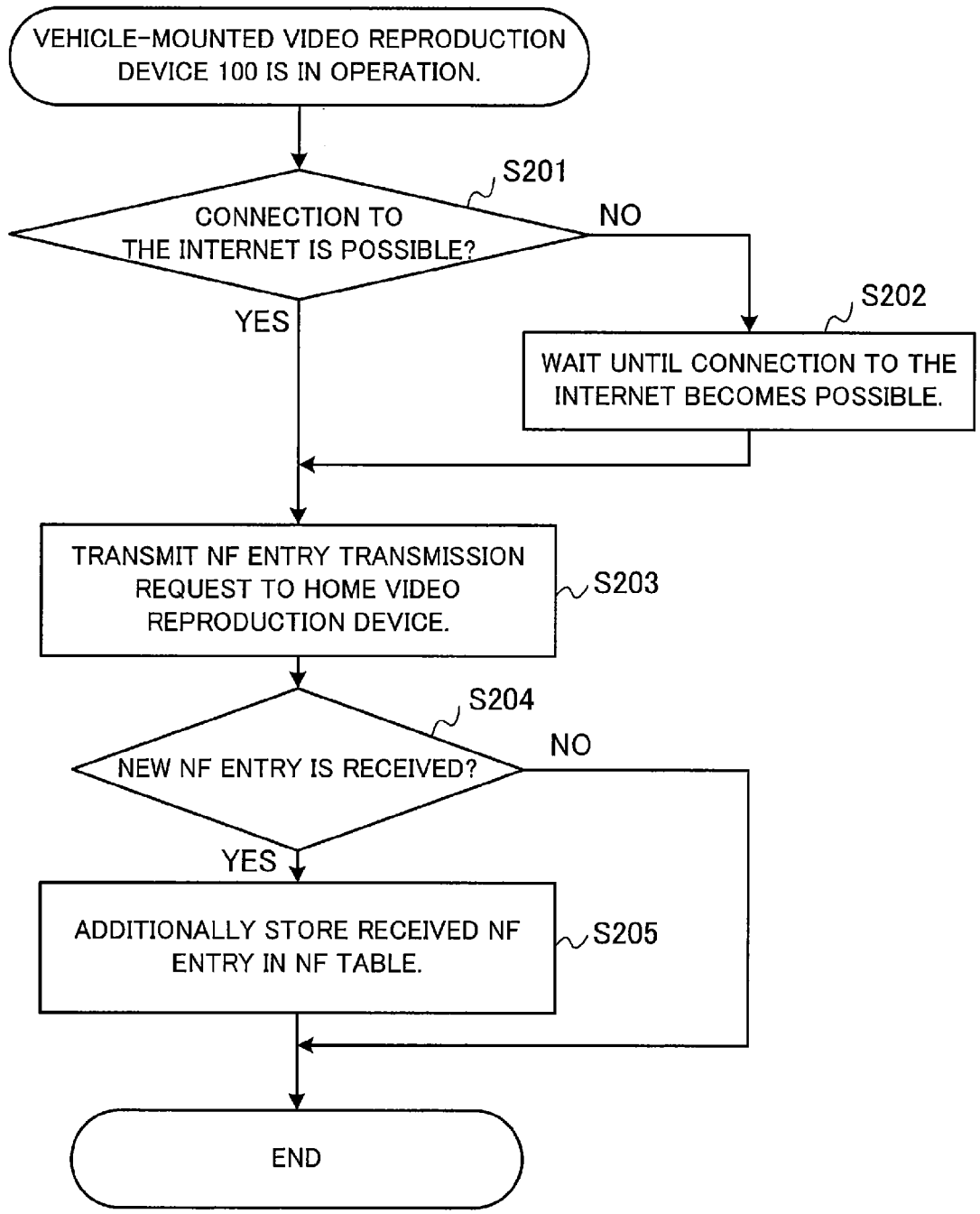
FIG. 8 is a flowchart showing processes of receiving an NF entry and storing it in an NF table, in the vehicle-mounted video reproduction device (second information reproduction device) according to the first embodiment.

FIG. 8 is a flowchart showing processes of receiving an NF entry and storing it in the NF table 134a, in the vehicle-mounted video reproduction device (second information reproduction device) 100 according to the first embodiment. While the vehicle-mounted video reproduction device 100 is in operation, if connection to the Internet 700 is possible (step S201), an NF entry transmission request is transmitted to the home video reproduction device 200 by the transmission-reception unit 133 (step S203) and it waits until an NF entry is received from the home video reproduction device 200 (step S204). If connection to the Internet 700 is impossible in step S201, the vehicle-mounted video reproduction device 100 waits until connection to the Internet 700 becomes possible, and when connection to the Internet 700 becomes possible, advances the process to step S203.

If the transmission-reception unit 133 receives an NF entry in step S204, the central controller 137 searches the NF table storage unit 134 for an NF entry having the same URL as the received NF entry. If an NF entry having the same URL is absent, a new NF entry is generated by assigning a new entry ID to the received NF entry and leaving the "file path in the NF storage unit 132", "date and time of last update of original file", "date and time of acquisition", and "file size" items blank, is added to the NF table 134a, and is stored in the NF table storage unit 134 (step S205).

If there is an NF entry having the same URL in the NF table storage unit 134, the process ends without adding any NF entry. The processes shown in FIG. 8 are repeated, for example periodically, while the vehicle-mounted video reproduction device 100 is in operation.

Figure 9:
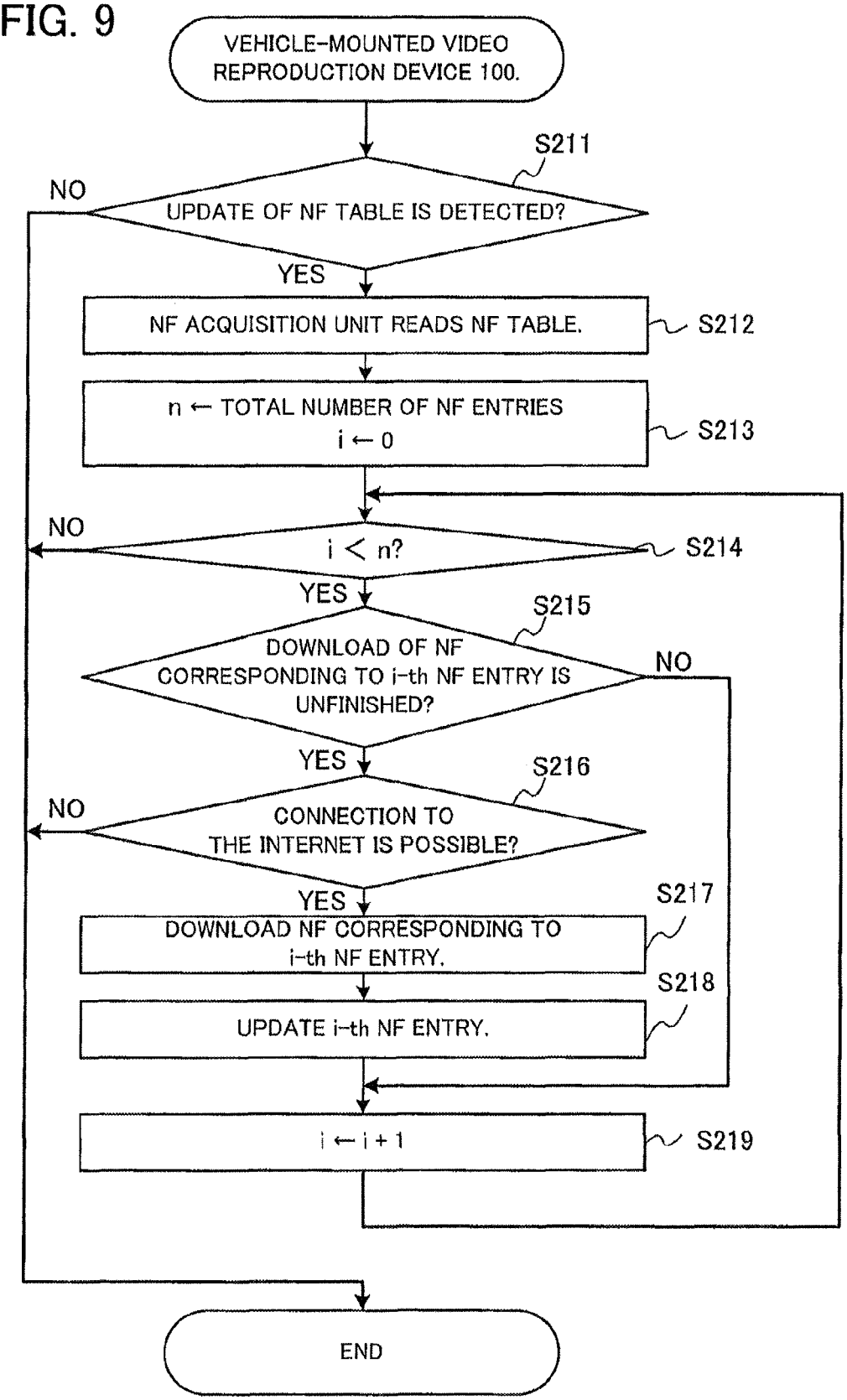
FIG. 9 is a flowchart showing processes of downloading a network file (NF) on the basis of an NF table, in the vehicle-mounted video reproduction device (second information reproduction device) according to the first embodiment.

FIG. 9 is a flowchart showing processes of downloading a network file (NF) on the basis of the NF table, in the vehicle-mounted video reproduction device (second information reproduction device) 100 according to the first embodiment. In the description given below, variables i and n of natural numbers are used as variables to describe repeated processes. Variable i is the count of the repeated processes, and can take the value ranging from 0 to n. Variable n is the maximum value of the count of variable i, and stores the total number of NF entries stored in the NF table 134a.

If the additional storing in the NF table 134a shown in FIG. 8 is performed while the vehicle-mounted video reproduction device 100 is in operation (step S211), the NF prior acquisition unit 136 reads the NF table 134a from the NF table storage unit 134 (step S212). Then, variable n stores the total number of NF entries stored in the read NF table 134a, and variable i is initialized to zero (step S213).

In step S214, the value of variable i and the value of variable n are compared. If the value of variable i is smaller than the value of variable n, the process proceeds to step S215.

In step S215, if the "acquisition state" item in the i-th NF entry in the NF table 134a is "not acquired", it is checked in step S216 whether connection to the Internet 700 is possible, and if connection to the Internet 700 is possible, the NF prior acquisition unit 136 performs the downloading of the network file from the URL described in "network file URL" in step S217 and stores it in the NF storage unit 132. When the downloading of the network file is completed, in step S218, in the i-th NF entry, the "acquisition state" item is changed to "acquired"; the position of the downloaded network file in the NF storage unit 132 is entered in the "file path in the NF storage unit 132" item; the last update date and time recorded in the downloaded network file is entered in the "date and time of last update of original file" item; the time at which downloading is completed is entered in the "date and time of acquisition" item; and the file size of the downloaded network file is entered in the "file size" item.

Finally, variable i is incremented, and the process returns to determination of step S214, and the processes from step S215 to step S218 are repeated for all the NF entries. If the process has been carried out for all the NF entries, as the value of variable i becomes equal to the value of variable N, the determination in step S214 becomes NO, and the process ends.

If it is determined in step S216 that connection to the Internet 700 is impossible, the NF table 134a is updated in the NF entries updated until then and the process ends without performing the downloading of subsequent files.

By means of the above processes, in the vehicle-mounted video reproduction device 100, it becomes possible to supply a network file from the NF storage unit 132 through the following steps when the player unit 110 requests the acquisition of a network file by a content application.

Figure 10:
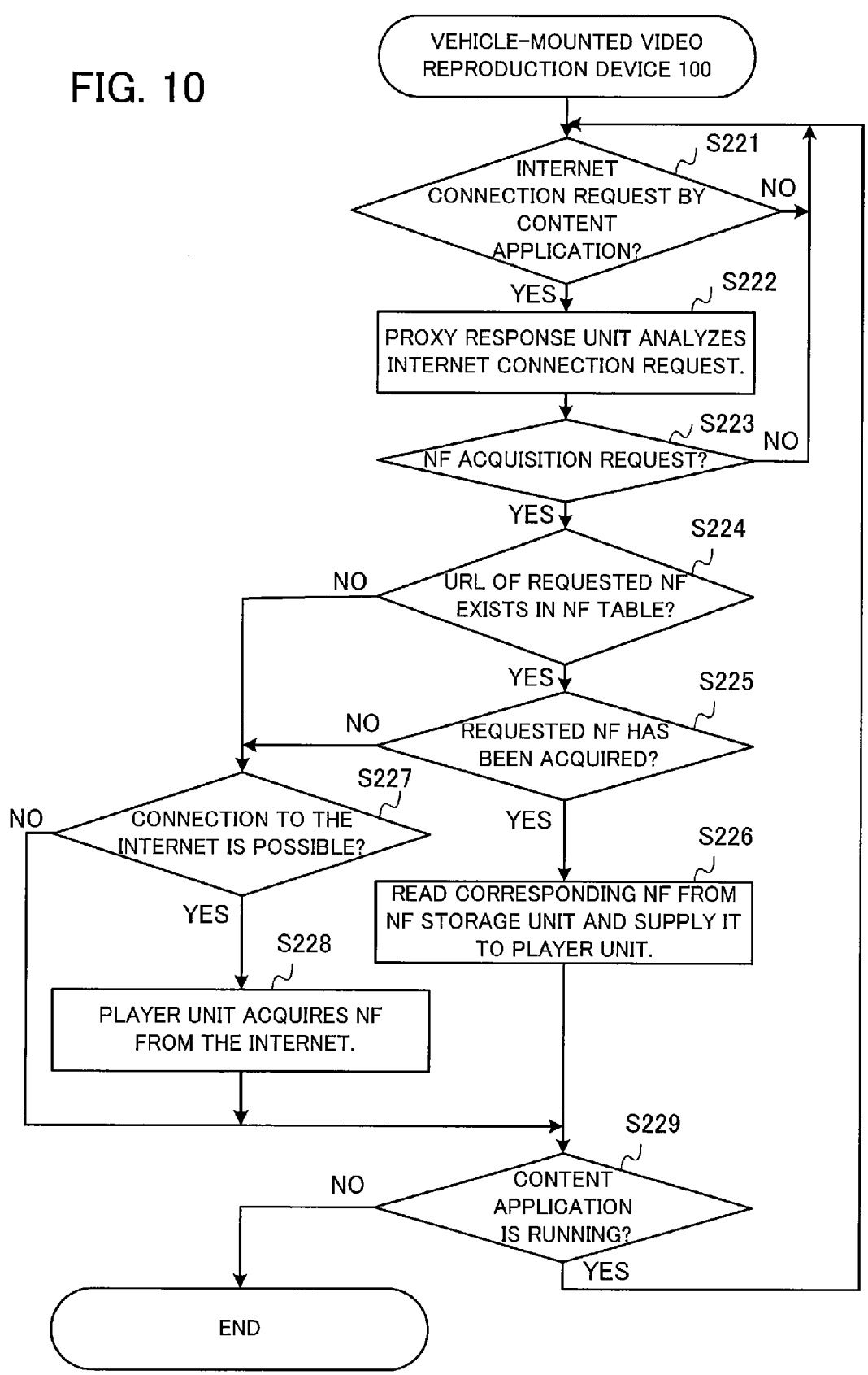
FIG. 10 is a flowchart showing processes in which a content application acquires a network file, in the vehicle-mounted video reproduction device (second information reproduction device) according to the first embodiment.

FIG. 10 is a flowchart showing processes in which a content application acquires a network file, in the vehicle-mounted video reproduction device (second information reproduction device) 100 according to the first embodiment. In step S221 in FIG. 10, when the player unit 110 makes a network connection request through the reproduction control of the content application, the network connection request is sent to the proxy response unit 131 and analyzed (step S222). As a result, if the network connection request is an NF acquisition request (step S223), the proxy response unit 131 acquires the NF table 134a from the NF table storage unit 134, and in step S224 performs the search as to whether or not an NF entry having the network file URL matching the URL requested by the NF acquisition request exists in the NF table 134a.

If an NF entry corresponding to the URL requested by the NF acquisition request exists in the NF table 134a (step S224), the proxy response unit 131 further checks the content of the "acquisition state" item in the NF entry (step S225). If it is "acquired" (YES in step S225), the proxy response unit 131 checks the "file path in the NF storage unit 132" of the NF entry, reads the corresponding network file from the NF storage unit 132 and supplies it to the player unit 110 (step S226), and the process proceeds to step S229.

If an NF entry corresponding to the URL requested by the NF acquisition request does not exist in the NF table 134a in step S224 and if connection to the Internet 700 is possible (step S227), the player unit 110 performs acquisition of the NF through the network connection unit 120 from the Internet 700 (step S228), and the process proceeds to step S229. If it is determined in step S227 that connection to the Internet 700 is impossible, the process proceeds to step S229 without performing acquisition of the NF.

In step S229, it is checked whether a content application is running. If the content application is running, the process returns to step S221, and a next network connection request is waited for. If no content application is running, the process ends.

In the process described above, timing at which the NF prior acquisition unit 136 operates is irrelevant to timing at which the optical disc 900 is inserted into the vehicle-mounted video reproduction device 100. That is, since it becomes possible that the vehicle-mounted video reproduction device 100 acquires the network file requested by a content application of the optical disc 900 before the optical disc 900 is inserted into the vehicle-mounted video reproduction device 100, time required from when the network file requested by the content application of the optical disc 900 is acquired until reproduction is started in the player unit 110 can be reduced. In addition, since the network file is acquired in advance at timing when connection to the Internet 700 is possible, even if connection to the Internet 700 is impossible when the optical disc 900 is inserted into the vehicle-mounted video reproduction device 100, time required until reproduction is started in the player unit 110 can be reduced if a necessary network file has already been acquired.

The vehicle-mounted video reproduction device 100 uses the network-connection-state determination unit 135 in order to determine "whether connection to the Internet 700 is possible".

The following processes may be also performed in consideration of the date and time of last update of the network file: First, on the side of the home video reproduction device 200, when the URL of the network file is stored in the NF entry storage unit 232 in step S105 in FIG. 6, the transmission-reception unit 233 transmits the network file URL, to which the time stamp held by the network file is added, to the vehicle-mounted video reproduction device 100.

Next, on the side of the vehicle-mounted video reproduction device 100, when the transmission-reception unit 133 additionally stores the network file URL as an NF entry in the NF table storage unit 134, the time stamp is overwritten to the "date and time of last update of the network file" item for the NF entry having the same network file URL. At the same time, the "date and time of acquisition" item and the overwritten "date and time of last update of the network file" are compared, and if the "date and time of acquisition" item is older, the "acquisition state" item is set to "not updated". If the "acquisition state" item is "not updated" when the NF prior acquisition unit 136 checks the "acquisition state" item in the NF table 134a, even if the corresponding file has been already acquired in the NF storage unit 132, this file is discarded and a corresponding file is acquired again from the Internet 700.

<1-3> Effects of First Embodiment

As described above, according to the video reproduction system, video reproduction method, and video reproduction device 100 according to the first embodiment, since an additional content which should be acquired via the Internet in response to a request of a content application recorded on the optical disc 900 is acquired and stored in the NF storage unit 132 in advance, when the optical disc 900 is reproduced, a reproduction target file recorded on the optical disc 900 and a network file acquired in response to the request of the content application can be reproduced while they are being associated (synchronized, for example) with each other. Furthermore, according to the video reproduction system, video reproduction method, and video reproduction device 100 according to the first embodiment, time from when the optical disc 900 is inserted into the video reproduction device 100 until reproduction is started can be reduced.

<1-4> Variation of First Embodiment

In the description given above, though an example in which the home video reproduction device 200 acquires the time stamp of the network file has been explained, the NF prior acquisition unit 136 in the vehicle-mounted video reproduction device 100 may make an inquiry to a supply source of a network file for each network file URL and acquire the time stamp of the network file to be stored in the NF storage unit 132.

Furthermore, in the description given above in relation to FIG. 9, when the NF prior acquisition unit 136 refers to the NF table 134a and acquires a network file, the process that the NF entries are acquired in the order in which they are registered in the NF table 134 is described. The order of acquiring the NF entries, however, may be different order. For example, the NF prior acquisition unit 136 may be configured so that it adds the order-of-priority information to each of the NF entries when the NF table 134a is created or updated and acquires network files in the order according to the added order-of-priority information.

In addition, for example, attention may be paid to the "file size" item of the NF entry in the NF table 134a, and order-of-priority information may be added to each of the NF entries so that the network files corresponding to the NF entries are downloaded in ascending order of file size, and the network files may be configured to be acquired in the order according to the added order-of-priority information. By adopting such methods, a lot of network files can be acquired in a short time while connection to the Internet 700 is possible.

Figure 11:
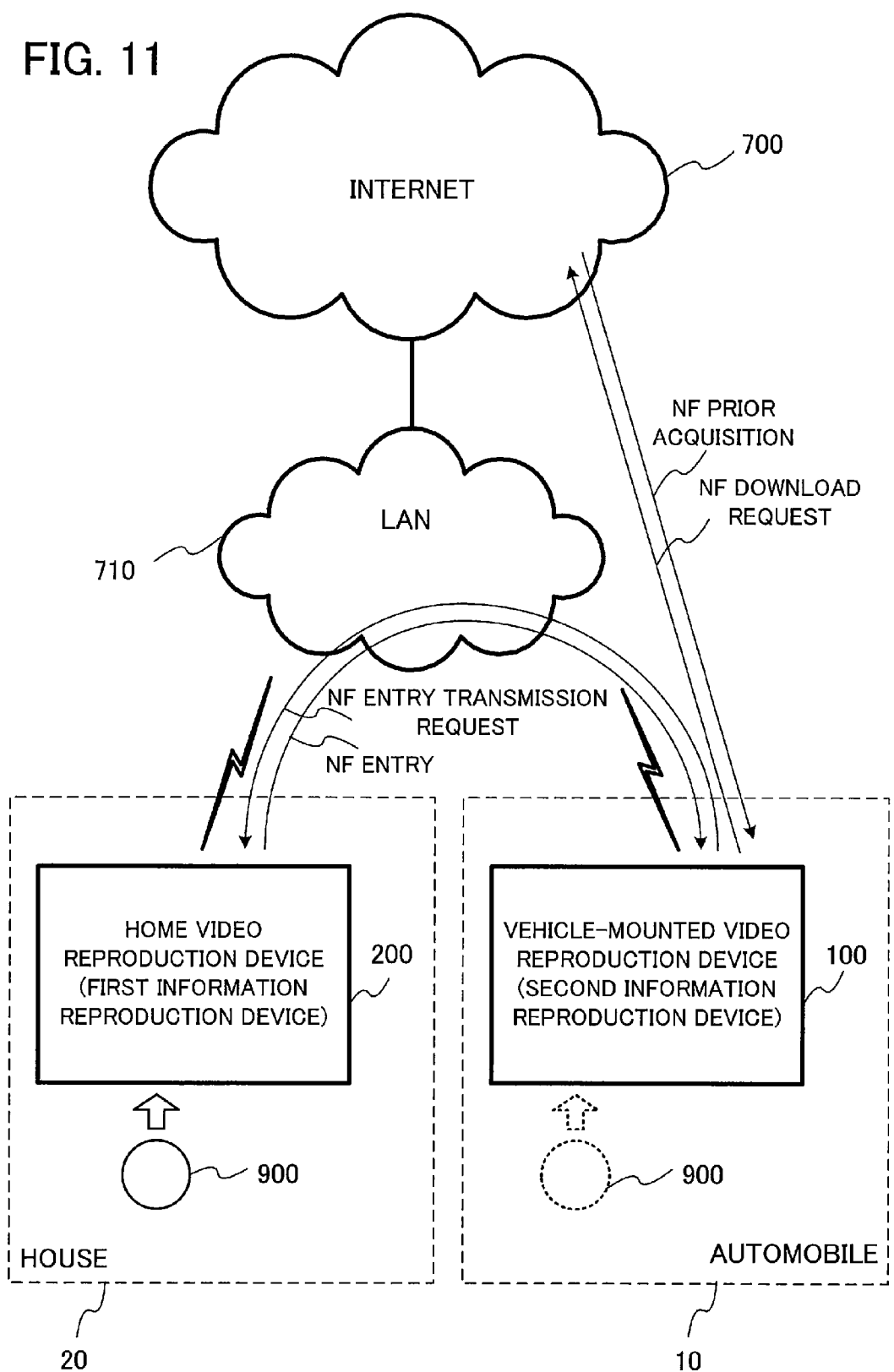
FIG. 11 is a diagram schematically showing the configuration of a video reproduction system (information reproduction system) according to a variation of the first embodiment.

FIG. 11 is a diagram schematically showing the configuration of a video reproduction system (information reproduction system) according to a variation of the first embodiment. In FIG. 11, components identical to or corresponding to components shown in FIG. 1 are denoted by the same reference characters. The video reproduction system (information reproduction system) shown in FIG. 11 differs from the video reproduction system (information reproduction system) according to the first embodiment shown in FIG. 1, in that the home video reproduction device 200 and the vehicle-mounted video reproduction device 100 can communicate with each other via a network 710 (e.g., a local area network (LAN) or a wide area network (WAN) or the like) and the home video reproduction device 200 and the vehicle-mounted video reproduction device 100 are connected through the network 710 to the Internet 700. The other points are the same as those of the video reproduction system (information reproduction system) shown in FIG. 1.

<2> Second Embodiment

<2-1> Configuration of Second Embodiment

Figure 12:
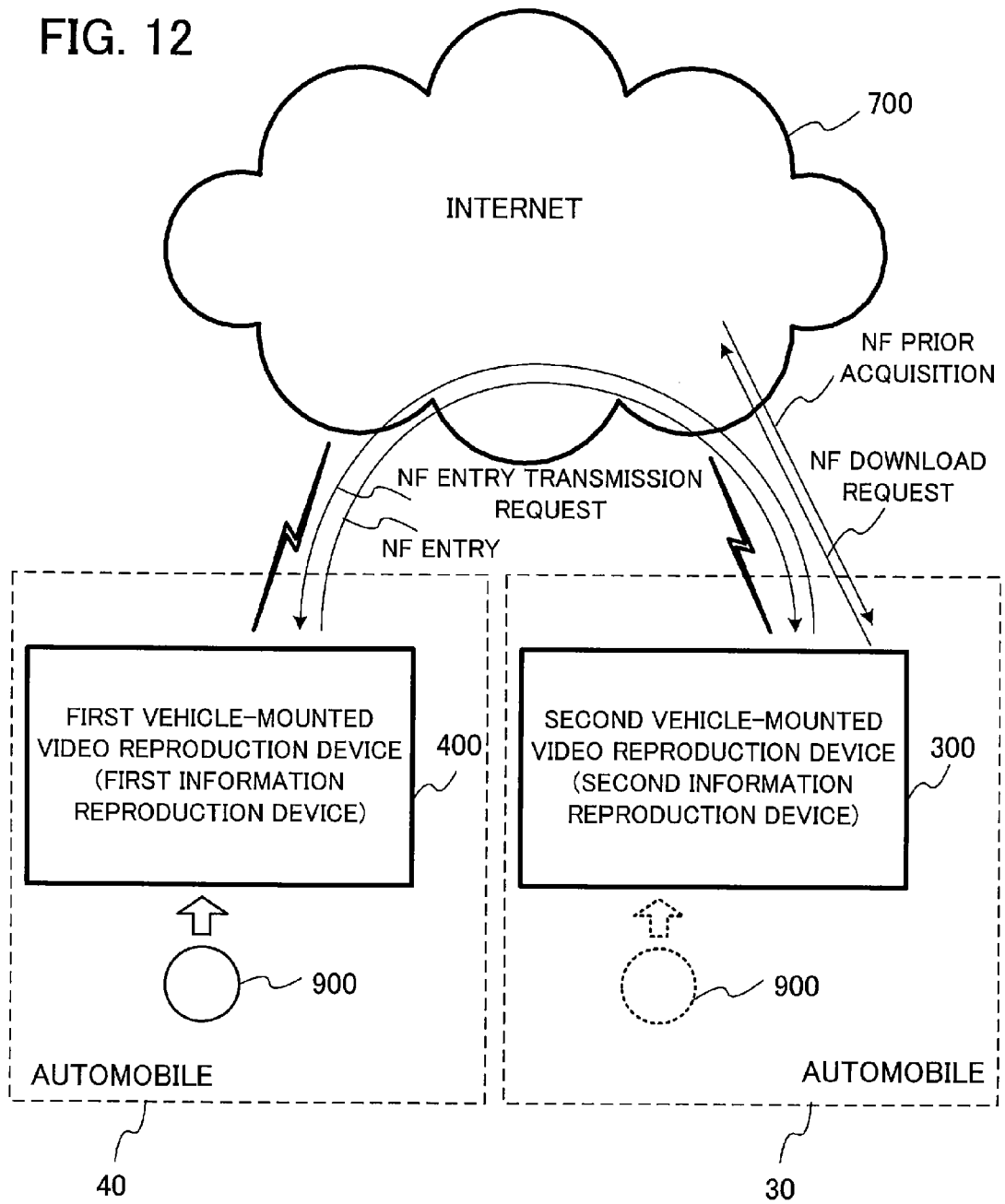
FIG. 12 is a diagram schematically showing the configuration of a video reproduction system (information reproduction system) according to a second embodiment of the present invention.

FIG. 12 is a diagram schematically showing the configuration of a video reproduction system according to a second embodiment of the present invention. In FIG. 12, components identical to or corresponding to components shown in FIG. 1 (first embodiment) are denoted by the same reference characters. As shown in FIG. 12, the video reproduction system according to the second embodiment differs from the video reproduction system according to the first embodiment in that each of first and second vehicle-mounted video reproduction devices 400, 300 has the configuration of combination of the home video reproduction device 200 and the vehicle-mounted video reproduction device 100 in the first embodiment.

As shown in FIG. 12, the video reproduction system (information reproduction system) according to the second embodiment includes the first vehicle-mounted video reproduction device (first information reproduction device) 400 and the second vehicle-mounted video reproduction device (second information reproduction device) 300, which can communicate with each other via the Internet 700 as a network. The first vehicle-mounted video reproduction device 400 is, for example, a device that is set up in an automobile 40, can be used while the automobile 40 is on the move, can perform wireless communication with the Internet 700, and can reproduce an optical disc (e.g., a BD, a DVD, a CD, and the like) 900 as a portable information recording medium. The second vehicle-mounted video reproduction device 300 has the same configuration as the first vehicle-mounted video reproduction device 400 and, for example, is a device that is set up in an automobile 30, can be used while the automobile 30 is on the move, can perform wireless communication with the Internet 700, and can reproduce an optical disc (e.g., a BD, a DVD, a CD, and the like) 900 as a portable information recording medium. The first and second information reproduction devices represented by the first and second vehicle-mounted video reproduction devices 400, 300 are not limited to vehicle-mounted devices and may be information reproduction devices designed to be carried around by the user or may be information reproduction devices to be set up in other mobile entities (e.g., a ship, a bicycle, a train, and the like).

Figure 13:
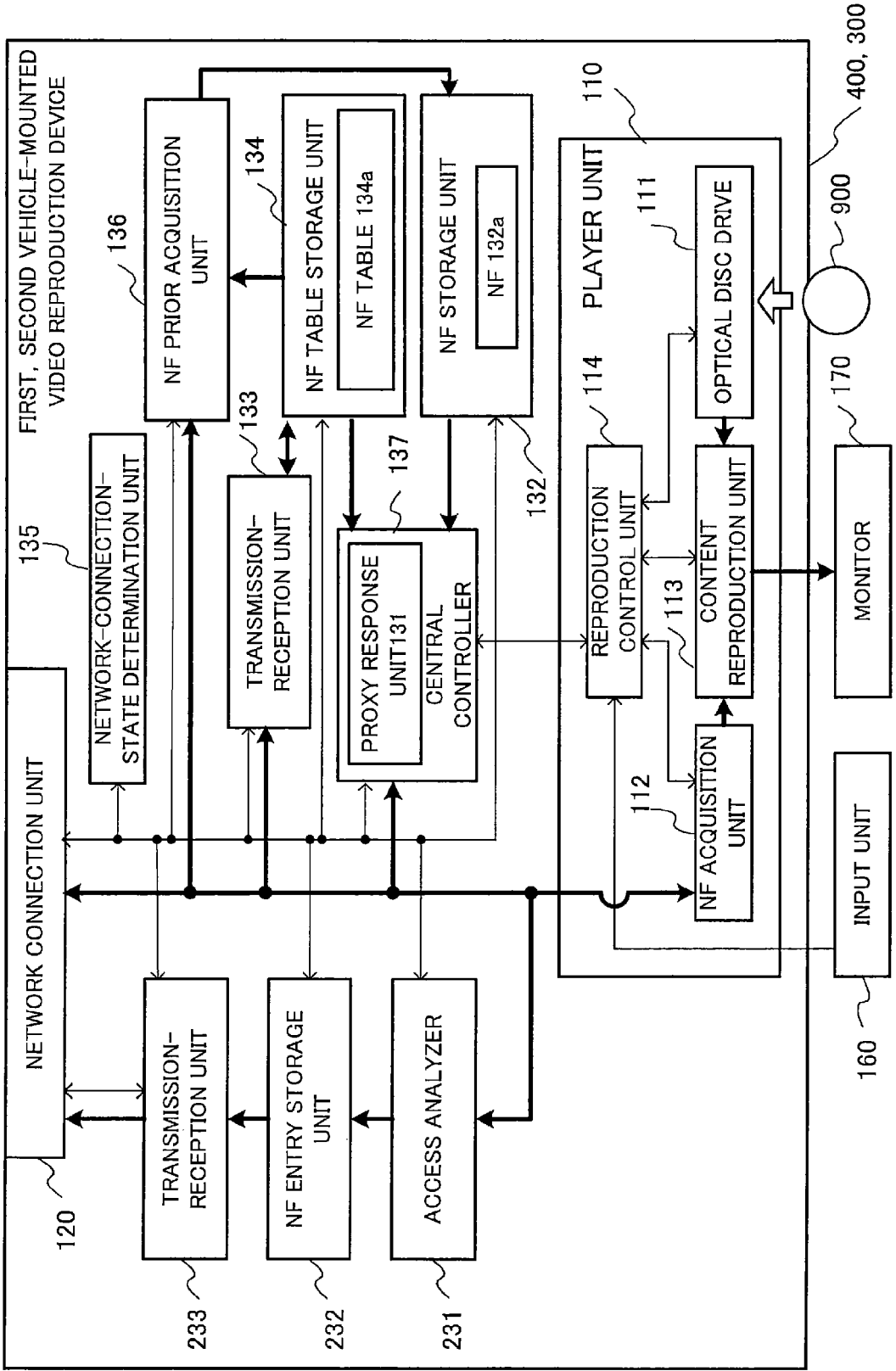
FIG. 13 is a block diagram schematically showing the configuration of first and second vehicle-mounted video reproduction devices (first and second information reproduction devices) according to the second embodiment.

FIG. 13 is a block diagram schematically showing the configuration of the first and second vehicle-mounted video reproduction devices (first and second information reproduction devices) 400, 300 according to the second embodiment. In FIG. 13, components identical to or corresponding to components shown in FIG. 3 (first embodiment) are denoted by the same reference characters. The first and second vehicle-mounted video reproduction devices 400, 300 according to the second embodiment have mutually the same configuration. As shown in FIG. 13, the first and second vehicle-mounted video reproduction devices 400, 300 according to the second embodiment differ from the vehicle-mounted video reproduction device 100 shown in FIG. 3 (first embodiment) in that they include an access analyzer 231, an NF entry storage unit 232, and a transmission-reception unit 233 which transmits an NF_URL. The functions of the access analyzer 231, NF entry storage unit 232, and transmission-reception unit 233 have already been described in the first embodiment using FIG. 2.

<2-2> Operation of Second Embodiment

Figure 14:
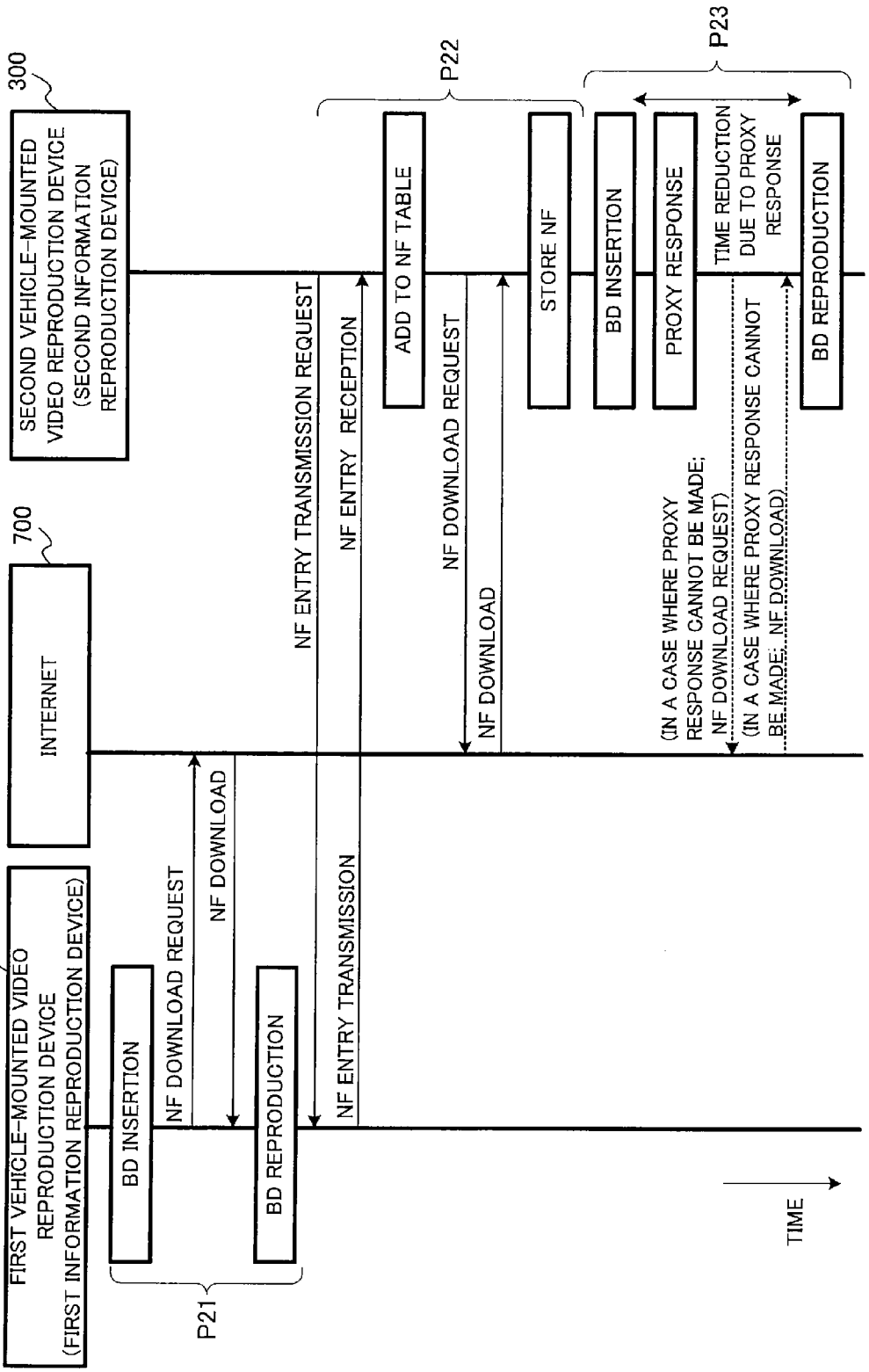
FIG. 14 is a sequence diagram schematically showing the operation of the video reproduction system (information reproduction system) and an information reproduction method according to the second embodiment.

FIG. 14 is a sequence diagram schematically showing the operation of the video reproduction system (information reproduction system) and an information reproduction method according to the second embodiment. As shown in FIG. 14, the video reproduction system (information reproduction system) according to the second embodiment is a system that includes the first vehicle-mounted video reproduction device 400 as the first information reproduction device and the second vehicle-mounted video reproduction device 300 as the second information reproduction device, which can communicate with each other. In FIG. 14, P21 denotes a reproduction process of a BD (an example of an optical disc) by the first vehicle-mounted video reproduction device 400; P22 denotes a preparation process before the beginning of reproduction by the second vehicle-mounted video reproduction device 300; and P23 denotes a reproduction process of a BD (an example of an optical disc) by the second vehicle-mounted video reproduction device 300.

As shown in process P21 of FIG. 14, when the first vehicle-mounted video reproduction device 400 reproduces the BD as the optical disc 900, after the BD is inserted, the first vehicle-mounted video reproduction device 400 stores an NF entry in the NF entry storage unit 232 (FIG. 13), transmits a download request of a network file (NF) to the Internet 700 in accordance with a download request by a content application recorded on the BD, and downloads the network file via the Internet 700. After the downloading of the network file is completed, the first vehicle-mounted video reproduction device 400 reproduces a main content which is reproduction target data recorded on the BD and an additional content included in the downloaded network file while they are being associated (synchronized, for example) with each other, and outputs a reproduction signal to the monitor.

As shown in process P22 of FIG. 14, in the preparation process before the beginning of reproduction by the second vehicle-mounted video reproduction device 300, the second vehicle-mounted video reproduction device 300 transmits an NF entry transmission request to the first vehicle-mounted video reproduction device 400, and the first vehicle-mounted video reproduction device 400, which has received the NF entry transmission request, transmits an NF entry to the second vehicle-mounted video reproduction device 300. The second vehicle-mounted video reproduction device 300 that has received the NF entry updates the NF table by using the received NF entry (adds the NF entry, for example). Thereafter, the second vehicle-mounted video reproduction device 300 transmits a download request of a network file (NF) to the Internet 700, downloads the network file via the Internet 700, and causes the NF storage unit 132 to store the network file 132a.

As shown in process P23 of FIG. 14, when the second vehicle-mounted video reproduction device 300 reproduces the BD as the optical disc 900, after the BD is inserted, the second vehicle-mounted video reproduction device 300 makes a download request of a network file (NF) in accordance with a download request by a content application recorded on the BD, but if the requested network file exists in the NF storage unit 132, it uses the network file stored in the NF storage unit 132 for reproduction (proxy response by the proxy response unit 131). If the requested network file does not exist in the NF storage unit 132, a proxy response cannot be made, and therefore the network file is downloaded via the Internet 700. After the proxy response is made or after the downloading of the network file is completed, the second vehicle-mounted video reproduction device 300 reproduces a main content which is reproduction target data recorded on the BD and an additional content contained in the downloaded network file while they are being associated (synchronized, for example) with each other, and outputs a reproduction signal to the monitor. In a case where a proxy response is made, time required from the insertion of the BD until the beginning of the reproduction of the BD can be reduced.

In the second embodiment, explanation will be made about the case where each of the first vehicle-mounted video reproduction device 400 and the second vehicle-mounted video reproduction device 300 is connected directly to the Internet 700 and they can communicate with each other via the Internet 700 (as shown in FIG. 12), or about the case where the first vehicle-mounted video reproduction device 400 and the second vehicle-mounted video reproduction device 300 are connected to the same local network, can communicate with each other, and can communicate with the Internet 700 through the local network.

The processes of the NF table 134*a* and an NF entry in the second embodiment are executed by the similar processes to the processes shown in FIG. 6 to FIG. 9. By replacing the "home video reproduction device" in FIG. 6 to FIG. 9 with the "first vehicle-mounted video reproduction device 400" and replacing the "vehicle-mounted video reproduction device" in FIG. 6 to FIG. 9 with the "second vehicle-mounted video reproduction device 300", almost the same processes are obtained. The difference from the first embodiment is that when the network file URL is transmitted to the second vehicle-mounted video reproduction device 300, the network-connection-state determination unit 135 check the network connection state.

Figure 15:
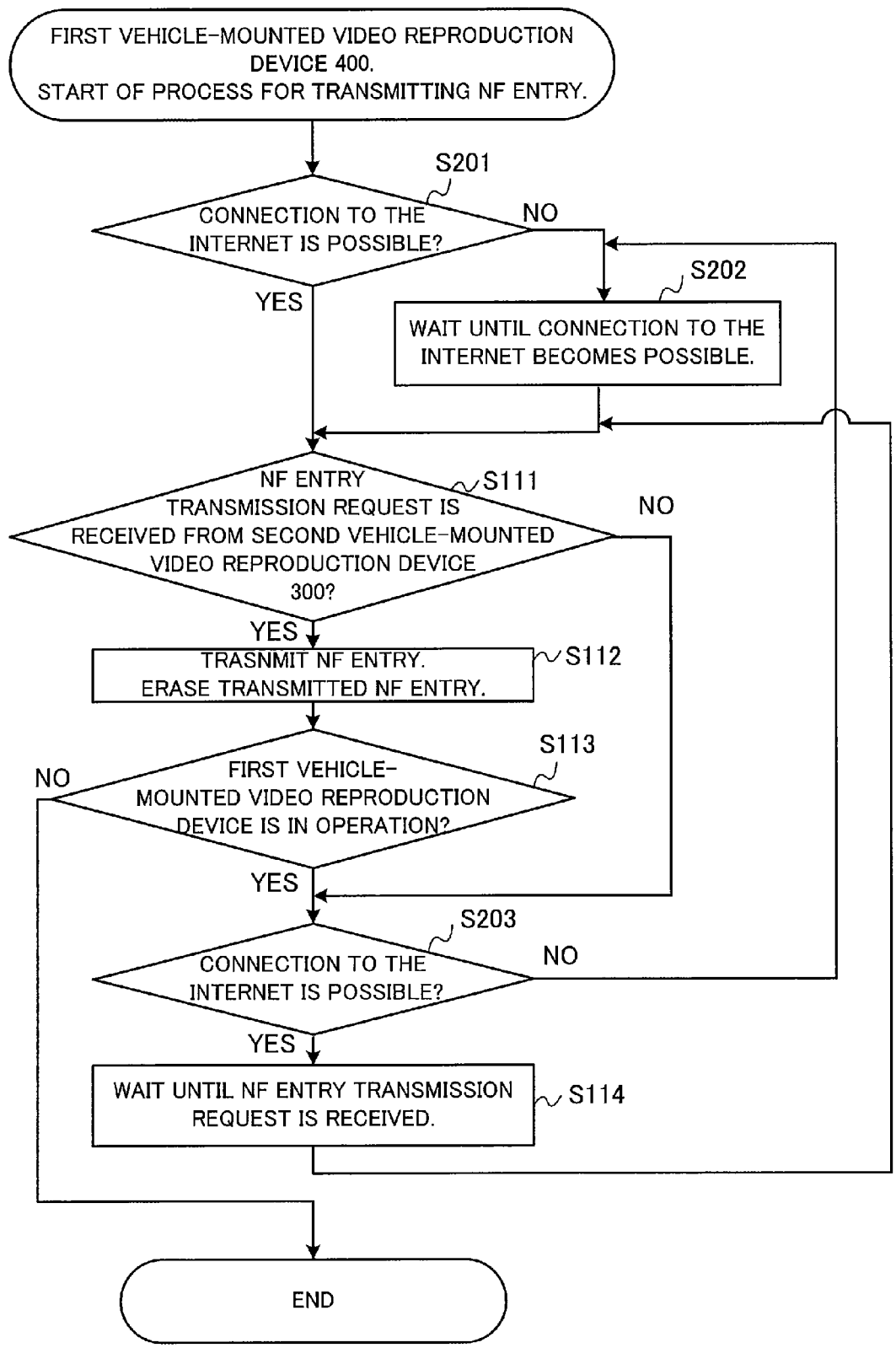
FIG. 15 is a flowchart showing processes of acquiring an NF entry, in the first vehicle-mounted video reproduction device (first information reproduction device) according to the second embodiment.

FIG. 15 is a flowchart showing processes of acquiring an NF entry in the first vehicle-mounted video reproduction device (first information reproduction device) 400 according to the second embodiment. As shown in FIG. 15, the processes of acquiring an NF entry in the second embodiment differ from those in FIG. 7 (first embodiment) in the points that steps S201 and S202 are present before step S111, and step S203 is present between step S113 and step S114.

In the first vehicle-mounted video reproduction device 400, if the network-connection-state determination unit 135 determines that connection to the Internet 700 is possible (step S201), the transmission-reception unit 233 waits for the receiving of an NF entry transmission request from the second vehicle-mounted video reproduction device 300. If connection to the Internet 700 is not possible, it is waited until connection to the Internet 700 becomes possible (step S202), and the process proceeds to step S111.

If an NF entry transmission request is received from the second vehicle-mounted video reproduction device 300 (step S111), the transmission-reception unit 233 acquires the NF entry stored in the NF entry storage unit 232, transmits this NF entry through the network connection unit 120 to the second vehicle-mounted video reproduction device 300, and then erases the transmitted NF entry from the NF entry storage unit 232 (step S112).

If, after step S112, the first vehicle-mounted video reproduction device 400 is in operation (step S113), it is checked again whether or not connection to the Internet 700 is possible (step S203). If connection to the Internet 700 is possible, the transmission-reception unit 233 again waits for an NF entry transmission request from the second vehicle-mounted video reproduction device 300 (step S114). If connection to the Internet 700 is impossible, the process proceeds to step S202, and it is waited again until connection to the Internet 700 becomes possible. If the first vehicle-mounted video reproduction device 400 is not in operation in step S113, the process ends.

<2-3> Effects of Second Embodiment

As described above, according to the video reproduction system, video reproduction method, and video reproduction devices 400, 300 according to the second embodiment, since an additional content that should be acquired via the Internet in response to a request of a content application recorded on the optical disc 900 is acquired and stored in the NF storage unit 132 in advance, when the optical disc 900 is reproduced, a reproduction target file recorded on the optical disc 900 and a network file acquired in response to the request of the content application can be reproduced while they are being associated (synchronized, for example) with each other. Furthermore, according to the video reproduction system, video reproduction method, and video reproduction devices 400, 300 according to the second embodiment, time from when the optical disc 900 is inserted into the video reproduction device until the reproduction is started can be reduced.

<2-4> Variation of Second Embodiment

In a variation of the second embodiment, as in a similar way to the first embodiment, the NF prior acquisition unit 136 may be configured to acquire a network file again, if updating of the acquired network file has been performed, by considering the date and time of last update of the network file. Through this process, the network file stored in the NF storage unit 132 can be synchronized with the network file on the Internet 700.

Furthermore, in another variation of the second embodiment, as in a similar way to the first embodiment, the NF prior acquisition unit 136 may be configured to acquire a network file of a smaller file size preferentially, by considering the file size of the network file. This process makes it possible to acquire more network files in a short time in which connection to the Internet 700 is possible.

<3> Third Embodiment

<3-1> Configuration of Third Embodiment

Figure 16:
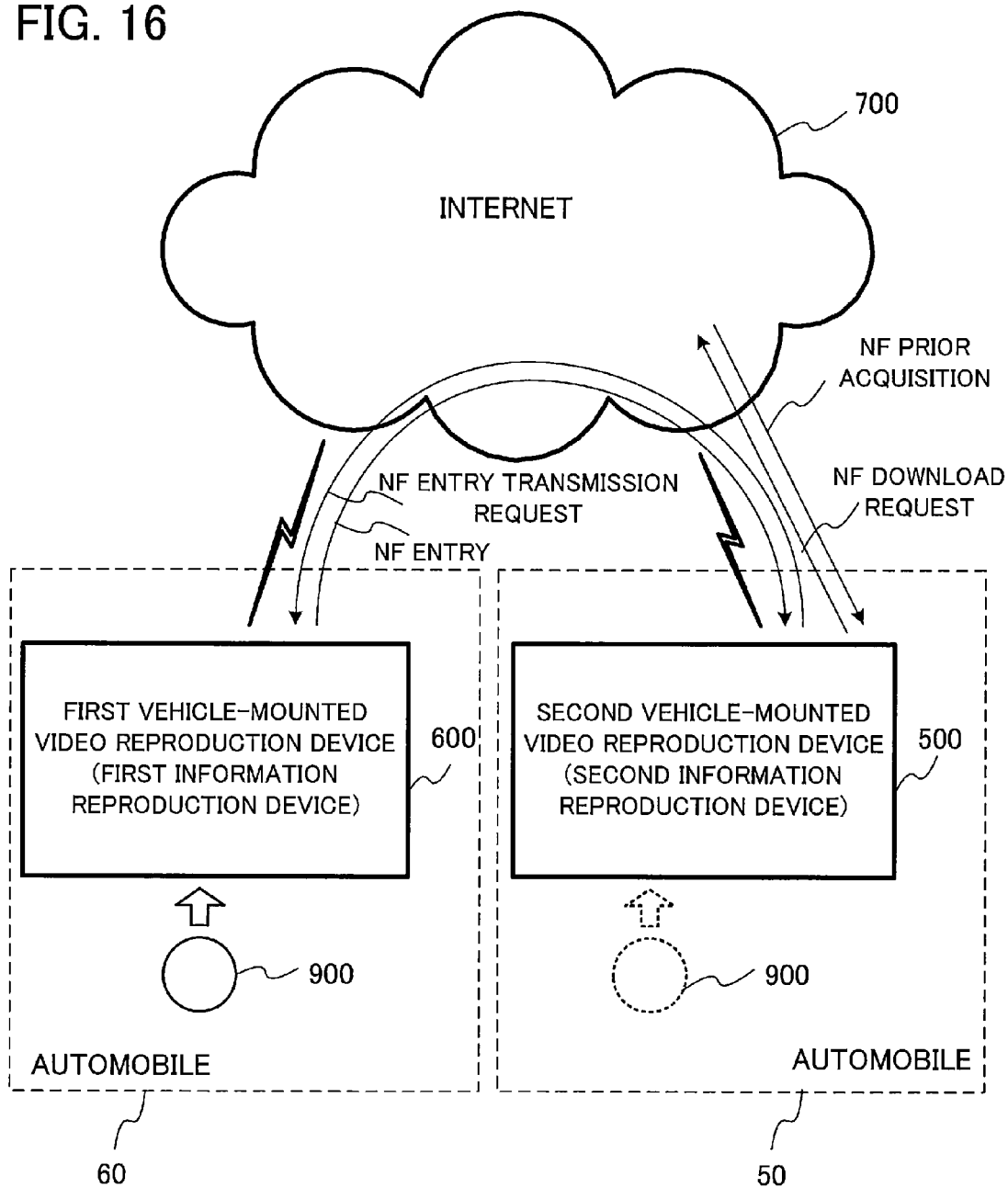
FIG. 16 is a diagram schematically showing the configuration of a video reproduction system (information reproduction system) according to a third embodiment of the present invention.

FIG. 16 is a diagram schematically showing the configuration of a video reproduction system (information reproduction system) according to a third embodiment of the present invention. In FIG. 16, components identical to or corresponding to components shown in FIG. 1 (first embodiment) are denoted by the same reference characters. As shown in FIG. 16, the video reproduction system according to the third embodiment differs from the video reproduction system according to the second embodiment in that each configuration of first and second vehicle-mounted video reproduction devices (first and second information reproduction devices) 600, 500 is simplified.

As shown in FIG. 16, the video reproduction system (information reproduction system) according to the third embodiment includes the first vehicle-mounted video reproduction device (first information reproduction device) 600 and the second vehicle-mounted video reproduction device (second information reproduction device) 500, which can communicate with each other via a network or via the Internet 700. The first vehicle-mounted video reproduction device 600 is, for example, a device that is set up in an automobile 60, can be used even while the automobile 60 is on the move, can perform wireless communication with the Internet 700, and can reproduce an optical disc (e.g., a BD, a DVD, a CD, and the like) 900 as a portable information recording medium. The second vehicle-mounted video reproduction device 500 is, for example, a device that is set up in an automobile 50, can be used even while the automobile 50 is on the move, can communicate with the Internet 700 by radio, and can reproduce an optical disc (e.g., a BD, a DVD, a CD, and the like) 900 as a portable information recording medium. Furthermore, the places of installation of the first and second information reproduction devices represented by the first and second vehicle-mounted video reproduction devices 600, 500 are not limited to inside automobiles. The information reproduction devices may be designed to be carried around by the user or to be set up in other mobile entities (e.g., a ship, a bicycle, a train, and the like).

The video reproduction devices 400, 300 according to the second embodiment include both the NF entry storage unit and the NF table storage unit. Since there is an overlap between information stored in these, the storage areas of the storage units are wasted. In the third embodiment, the NF table storage unit 134 is configured to be capable of being also used as an NF entry storage unit (e.g., 232 in FIG. 13).

Figure 17:
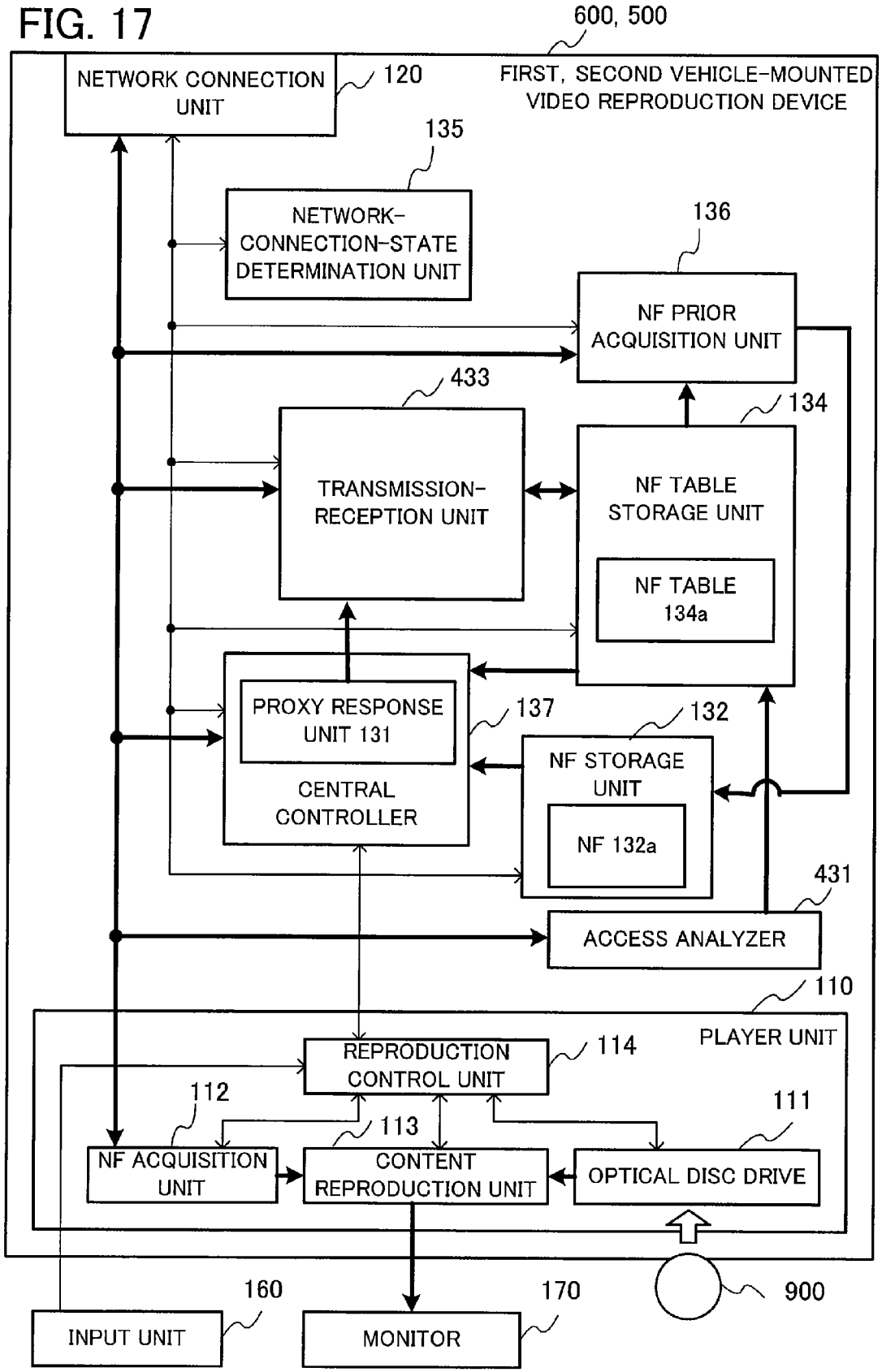
FIG. 17 is a block diagram schematically showing the configuration of first and second vehicle-mounted video reproduction devices (first and second information reproduction devices) according to the third embodiment.

FIG. 17 is a block diagram schematically showing the configuration of the first and second vehicle-mounted video reproduction devices (first and second information reproduction devices) 600, 500 according to the third embodiment. In FIG. 17, components identical to or corresponding to components shown in FIG. 13 (second embodiment) are denoted by the same reference characters. The first and second vehicle-mounted video reproduction devices 600, 500 shown in FIG. 17 differ from the vehicle-mounted video reproduction devices 400, 300 according to the second embodiment in that the NF entry storage unit (e.g., 232 in FIG. 13) is not included. The access analyzer 431 gives a network file URL contained in an acquired NF entry to the NF table storage unit 134. Transmission of an NF entry is performed from the transmission-reception unit 433.

<3-2> Operation of Third Embodiment

Figure 18:
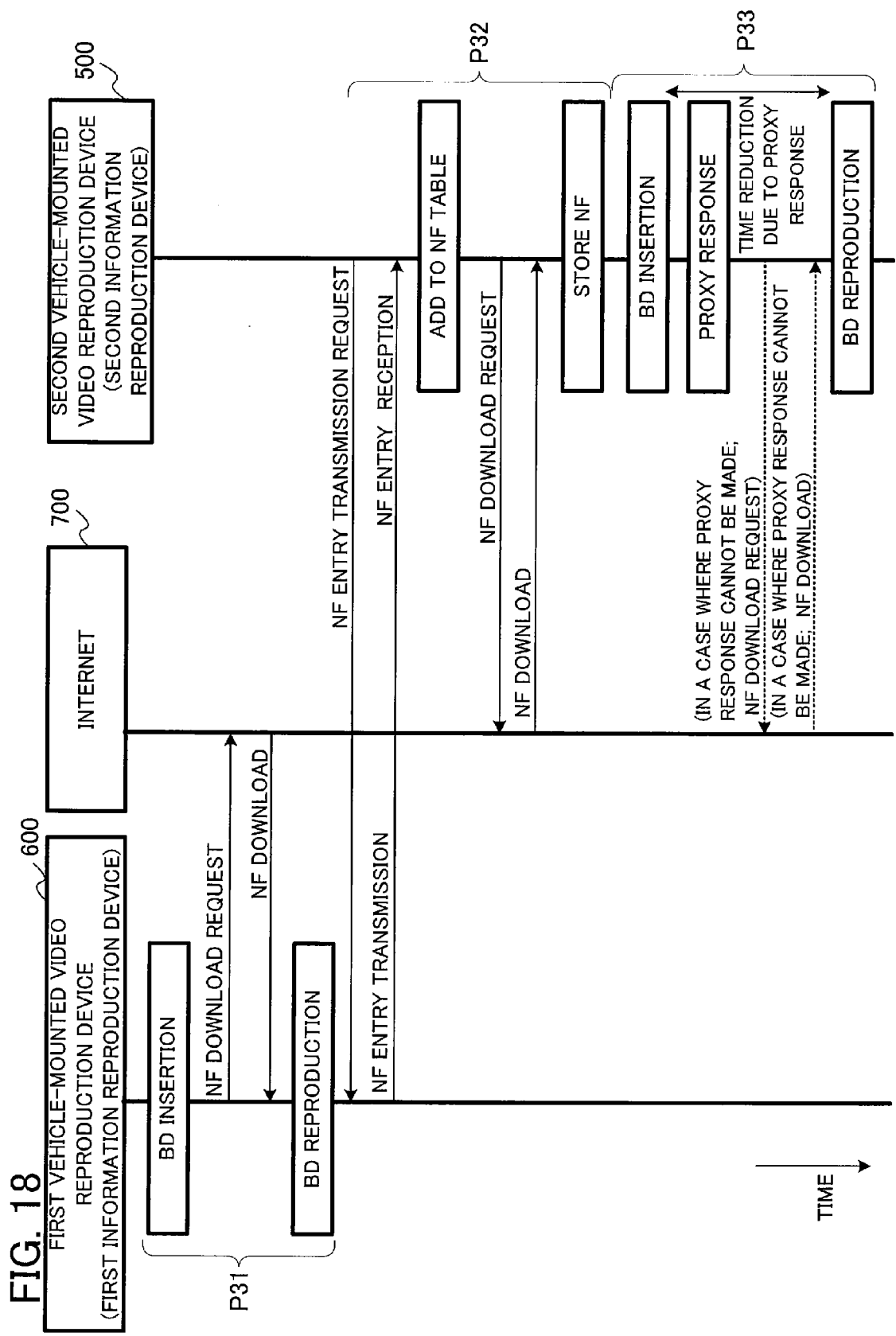
FIG. 18 is a sequence diagram schematically showing the operation of the video reproduction system (information reproduction system) and an information reproduction method according to the third embodiment.

FIG. 18 is a sequence diagram schematically showing the operation of the video reproduction system (information reproduction system) and an information reproduction method according to the third embodiment. As shown in FIG. 17, the video reproduction system (information reproduction system) according to the third embodiment is a system that includes the first vehicle-mounted video reproduction device 600 as the first information reproduction device and the second vehicle-mounted video reproduction device 500 as the second information reproduction device, which can communicate with each other. In FIG. 18, P31 denotes a reproduction process of a BD (an example of an optical disc) by the first vehicle-mounted video reproduction device 600; P32 denotes a preparation process before the beginning of reproduction by the second vehicle-mounted video reproduction device 500; P33 denotes a reproduction process of a BD (an example of an optical disc) by the second vehicle-mounted video reproduction device 500.

As shown in process P31 of FIG. 18, when the first vehicle-mounted video reproduction device 600 reproduces the BD as the optical disc 900, after the BD is inserted, the first vehicle-mounted video reproduction device 600 stores an NF entry in the NF table storage unit 134 (FIG. 17), transmits a download request of a network file (NF) to the Internet 700 in accordance with a download request by a content application recorded on the BD, and downloads the network file via the Internet 700. After the downloading of the network file is completed, the first vehicle-mounted video reproduction device 600 reproduces a main content which is reproduction target data recorded on the BD and an additional content contained in the downloaded network file while they are being associated (synchronized, for example) with each other, and outputs a reproduction signal to the monitor.

As shown in process P32 of FIG. 18, in the preparation process before the beginning of reproduction by the second vehicle-mounted video reproduction device 500, the second vehicle-mounted video reproduction device 500 transmits an NF entry transmission request to the first vehicle-mounted video reproduction device 600, and the first vehicle-mounted video reproduction device 600, which has received the NF entry transmission request, transmits an NF entry to the second vehicle-mounted video reproduction device 500. The second vehicle-mounted video reproduction device 500 that has received the NF entry updates the NF table by using the received NF entry (adds the NF entry or replaces the NF entry with the newest one, for example). Thereafter, the second vehicle-mounted video reproduction device 500 causes a download request of a network file to be generated, transmits the download request of the network file (NF) to the Internet 700, downloads the network file via the Internet 700, and causes the NF storage unit 132 to store the network file, thereby executing NF prior acquisition.

As shown in process P33 of FIG. 18, when the second vehicle-mounted video reproduction device 500 reproduces the BD as the optical disc 900 after the BD is inserted, the second vehicle-mounted video reproduction device 500 makes a download request of a network file (NF) in accordance with a download request by a content application recorded on the BD, but if the requested network file exists in the NF storage unit 132, it uses the network file stored in the NF storage unit 132 for reproduction (proxy response by the proxy response unit 131). If the requested-network file does not exist in the NF storage unit 132, no proxy response can be made, and therefore the network file is downloaded via the Internet 700. After the proxy response is made or after the downloading of the network file is completed, the second vehicle-mounted video reproduction device 500 reproduces a main content which is reproduction target data recorded on the BD and an additional content contained in the downloaded network file while they are being associated (synchronized, for example) with each other, and outputs a reproduction signal to the monitor. If the proxy response is made, time required from the insertion of the BD until the beginning of the reproduction of the BD can be reduced.

In the third embodiment, explanation will be made about the case where each of the first vehicle-mounted video reproduction device 600 and the second vehicle-mounted video reproduction device 500 are connected directly to the Internet 700 and they can communicate with each other via the Internet 700 (as shown in FIG. 16), or about the case where the first vehicle-mounted video reproduction device 600 and the second vehicle-mounted video reproduction device 500 are connected to the same local network, can communicate with each other, and can communicate with the Internet 700 through the local network.

Figure 19:
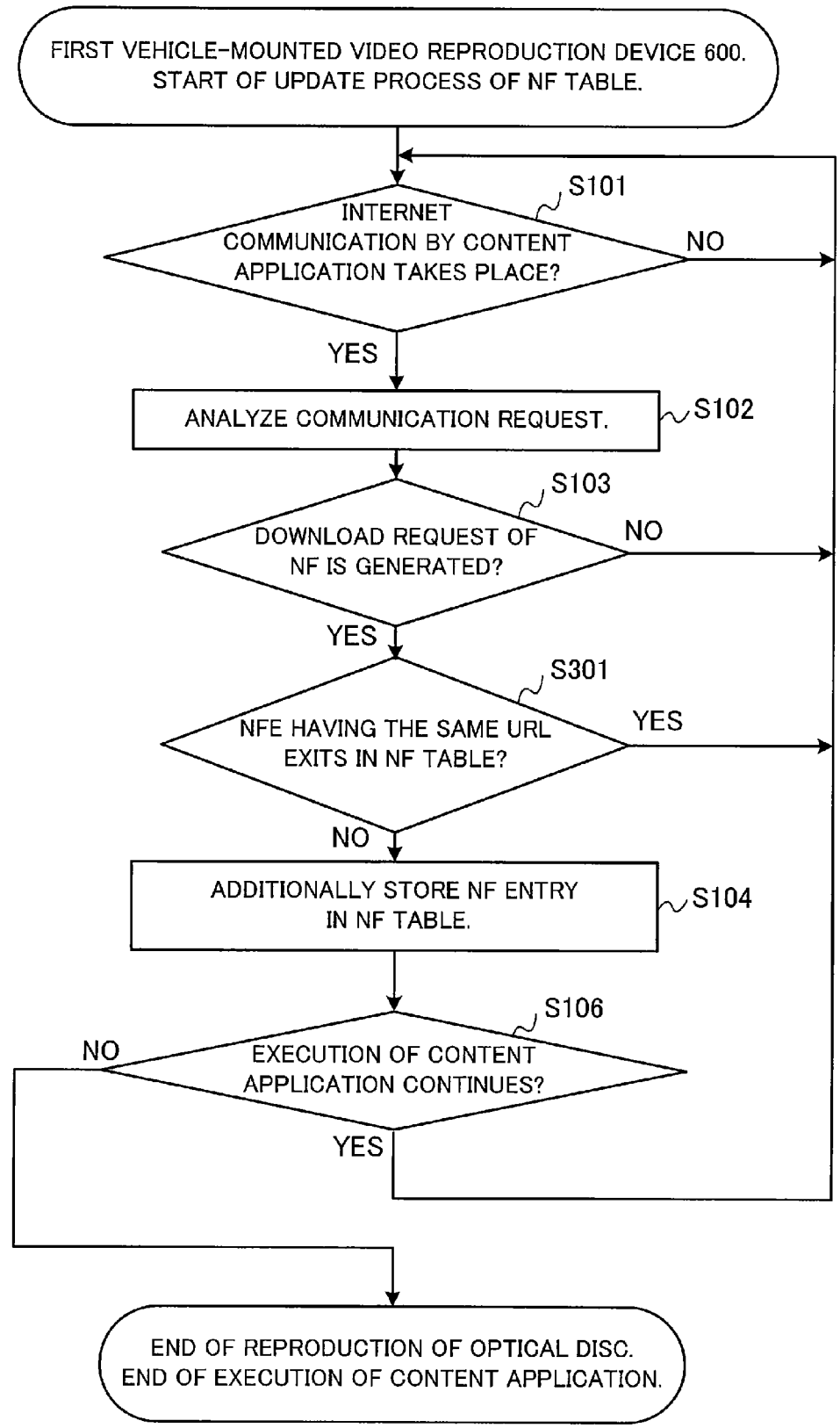
FIG. 19 is a flowchart showing processes of acquiring an NF entry, in the first vehicle-mounted video reproduction device (first information reproduction device) according to the third embodiment.
Figure 20:
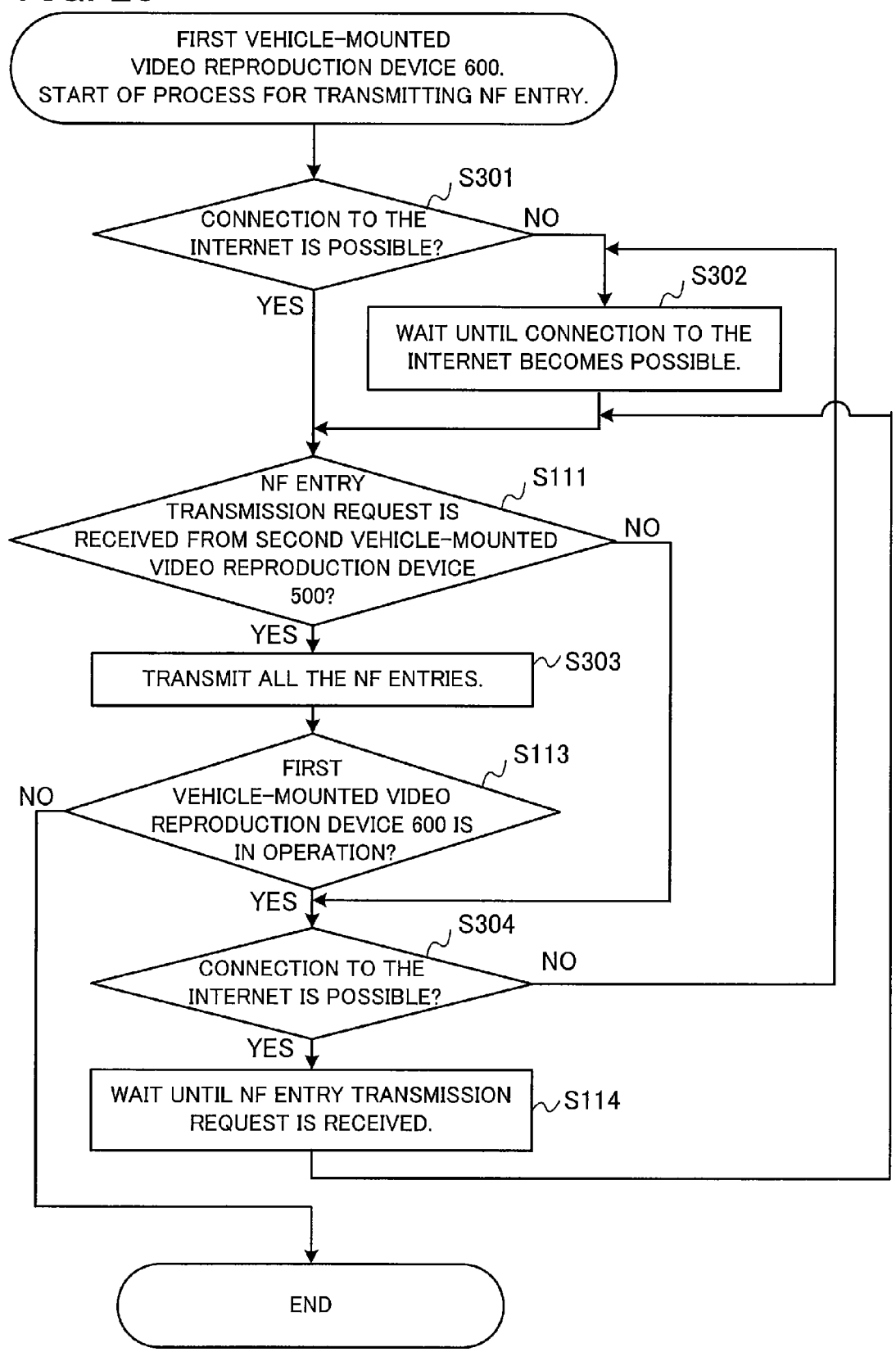
FIG. 20 is a flowchart showing processes of transmitting an NF entry, in the first vehicle-mounted video reproduction device (first information reproduction device) according to the third embodiment.

FIG. 19 is a flowchart showing processes of acquiring an NF entry in the first vehicle-mounted video reproduction device (first information reproduction device) 600 according to the third embodiment. FIG. 20 is a flowchart showing processes of transmitting an NF entry in the first vehicle-mounted video reproduction device (first information reproduction device) according to the third embodiment. Since processes executed in the first vehicle-mounted video reproduction device 600 (FIG. 19, FIG. 20) are similar to those described in FIG. 6 and FIG. 7, the same steps are denoted by the same reference characters as those used in FIG. 6 and FIG. 7.

First, explanation is made about generation of an NF entry with use of FIG. 19. The same processes as those in the steps denoted by the same reference characters in FIG. 6 are performed in steps S101, S102, and S103 in FIG. 19, respectively. In step S301, the access analyzer 431, first, in the network file URL obtained by analyzing a network connection request of the player unit 110, reads the NF table 134a from the NF table storage unit 134 and checks whether or not any NF entry that has the same network file URL exists (step S301). If there is no such entry, a new entry ID is generated and additionally stored as an NF entry in the NF table 134a (step S104). The following step S106 is the same process as step S106 in FIG. 6. While the content application is running, the processes of FIG. 19 are repeated.

Next, in the flow in FIG. 20, if the first vehicle-mounted video reproduction device 600 receives an NF entry transmission request from the second vehicle-mounted video reproduction device 500 (step S111), the transmission-reception unit 433 acquires all of the NF entries stored in the NF table storage unit 134 and transmits these NF entries through the network connection unit 120 to the second vehicle-mounted video reproduction device 500 (step S303). At this time, in the third embodiment, unlike the second embodiment, erasing of the transmitted NF entries is not performed.

After step S111, if the first vehicle-mounted video reproduction device 400 is in operation (step S113), it is checked again whether or not connection to the Internet 700 is possible (step S304). If connection to the Internet 700 is possible, the transmission-reception unit 433 as an NF entry transmission unit waits for an NF entry transmission request from the second vehicle-mounted video reproduction device 500 again (step S114). If connection to the Internet 700 is impossible, the process proceeds to step S302, and it is waited until connection to the Internet 700 becomes possible again. If the first vehicle-mounted video reproduction device 600 is not in operation in step S113, the process ends as a matter of course.

The receiving of an NF entry, prior acquisition of the NF, and providing of the NF to the player unit in the third embodiment are the same as those in the first embodiment.

<3-3> Effects of Third Embodiment

As described above, according to the video reproduction system, video reproduction method, and video reproduction devices 600, 500 according to the third embodiment, since an additional content that should be acquired via the Internet in response to a request of a content application recorded on the optical disc 900 is acquired and stored in the NF storage unit 132 in advance, when the optical disc 900 is reproduced, a reproduction target file recorded on the optical disc 900 and a network file acquired in response to a request of the content application can be reproduced while they are being associated (synchronized, for example) with each other. In addition, according to the video reproduction system, video reproduction method, and video reproduction devices 600, 500 according to the third embodiment, time from when the optical disc 900 is inserted into the video reproduction device until reproduction is started can be reduced.

According to the video reproduction system, video reproduction method, and video reproduction devices 600, 500 according to the third embodiment, the NF entry storage unit provided in the second embodiment is eliminated and unified management of the NF entries is performed in the NF table storage unit. Thereby, the number of storage units can be reduced and the installation cost can be reduced.

<3-4> Variation of Third Embodiment

In a variation of the third embodiment, as in a similar way to the first embodiment, the NF prior acquisition unit may be configured to acquire a network file again, if updating of the acquired network file has been performed, by considering the date and time of last update of the network file. Through this process, the network file stored in the NF storage unit 132 can be synchronized with the network file on the Internet 700.

Furthermore, in another variation of the third embodiment, as in a similar way to the first embodiment, the NF prior acquisition unit may be configured to acquire a network file of a smaller file size preferentially, by considering the file size of the network file. This process makes it possible to acquire a lot of network files even if connection to the Internet 700 is allowed in a short time.

<4> Fourth Embodiment

<4-1> Configuration of Fourth Embodiment

In the first embodiment, the video reproduction devices and network system that are configured to analyze a network access request of a content application and generate and store an NFE (NF entry) within one reproduction device and to provide it in response to a request from another reproduction device are shown. However, the component that analyzes a network access request of a content application is not necessarily present within a reproduction device and may be provided as an external device of the reproduction device. In a fourth embodiment, a network system in which a component of performing access analysis is independent of the video reproduction device will be described.

Figure 21:
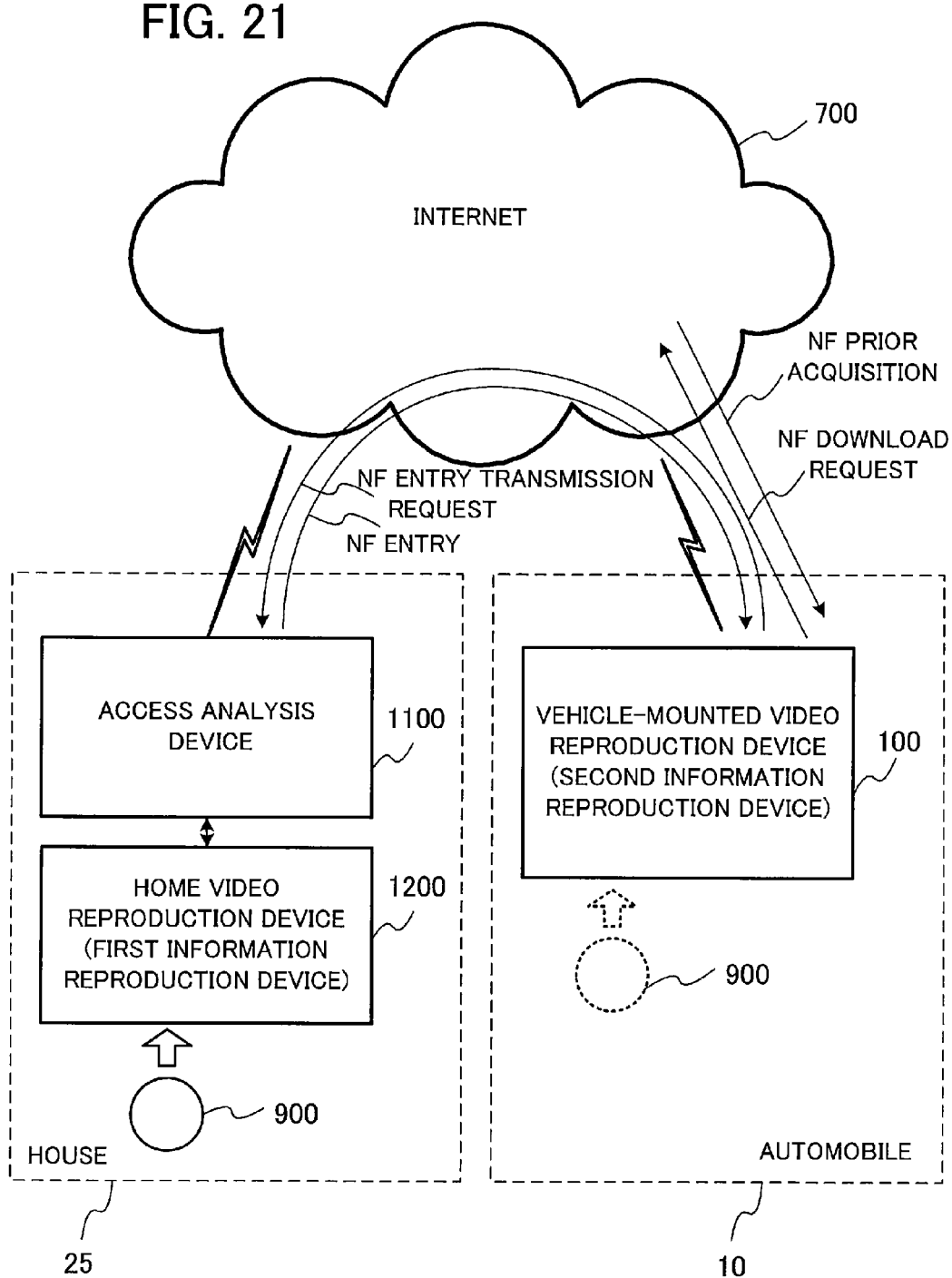
FIG. 21 is a diagram schematically showing the configuration of a video reproduction system (information reproduction system) according to a fourth embodiment.

FIG. 21 is a diagram schematically showing the configuration of a video reproduction system (information reproduction system) according to the fourth embodiment of the present invention. In FIG. 21, components identical to or corresponding to components shown in FIG. 1 (first embodiment) are denoted by the same reference characters as those shown in FIG. 1. As shown in FIG. 21, the video reproduction system according to the fourth embodiment differs from the video reproduction system according to the first embodiment in that two separated components, which are a home video reproduction device (first information reproduction device) 1200 and an access analysis device 1100, are included as components equivalent to the home video reproduction device (first information reproduction device) 200 in the first embodiment.

Figure 22:
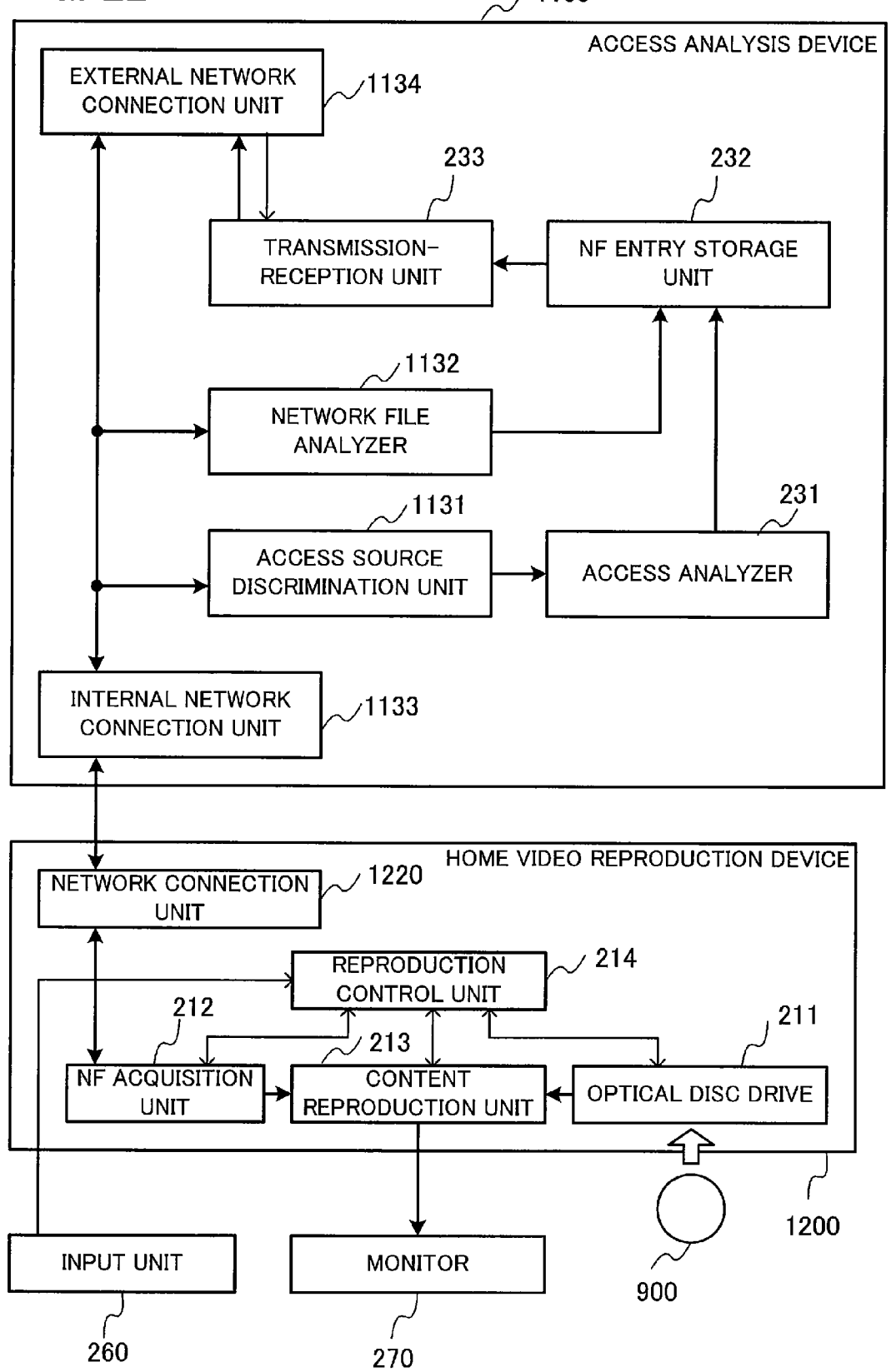
FIG. 22 is a block diagram schematically showing the configuration of a home video reproduction device (first information reproduction device) and an access analysis device according to the fourth embodiment.

FIG. 22 is a block diagram schematically showing the configuration of the home video reproduction device 1200 and the access analysis device 1100 according to the fourth embodiment. In FIG. 22, components identical to or corresponding to components shown in FIG. 2 (first embodiment) are denoted by the same reference characters as those shown in FIG. 2.

The home video reproduction device 1200 in FIG. 22 includes a network connection unit 1220 in addition to the components 211 to 214 which are the same as components included in the player unit 210 in FIG. 2. Among the components of the home video reproduction device 1200, components other than the network connection unit 1220 have the same function as the components in the player unit 210 shown in FIG. 2, and therefore there is not description about those components. The network connection unit 1220 receives an NF acquisition request from the NF acquisition unit 212 and acquires a network file through the access analysis device 1100 from the Internet 700. As in a similar way to the first embodiment, the network connection unit 1220 is connected to the Internet by wired communication, but it may also be connected by wireless communication.

The access analysis device 1100 includes an access source discrimination unit 1131, a network file analyzer 1132, an internal network connection unit 1133, and an external network connection unit 1134, in addition to the components 231 to 233 which are the same as the components other than the player unit 210 among the components of the home video reproduction device 200 in FIG. 2. Among the components of the access analysis device 1100, the components other than the access source discrimination unit 1131, network file analyzer 1132, internal network connection unit 1133, and external network connection unit 1134 have the same function as the components denoted by the same reference characters in FIG. 2, and therefore there is not description about those components.

The access source discrimination unit 1131 analyzes an Internet connection request which passes the internal network connection unit 1133, determines whether or not the request source of the Internet connection request is a content application executed by the home video reproduction device 1200, and if the request source is the content application, gives the content of the connection request to the access analyzer 231.

The network file analyzer 1132 receives communication from the external network connection unit 1134, analyzes the content of the communication, and if there is any character string that can be recognized as a network file URL, gives the character string to the NF entry storage unit 232.

The internal network connection unit 1133 gives a communication from a network device connected to the internal network connection unit 1133, to the external network connection unit 1134 and the access source discrimination unit 1131, and receives the communication from the external network connection unit 1134 and gives it to the network device. In the fourth embodiment, the network device indicates the home video reproduction device 1200.

The external network connection unit 1134 gives the communication from the Internet 700 to the internal network connection unit 1133 and gives it to the network file analyzer 1132.

The vehicle-mounted video reproduction device (second information reproduction device) 100 in the fourth embodiment is the same as that in the first embodiment.

<4-2> Operation of Fourth Embodiment

The operation of the access analysis device 1100 in the fourth embodiment is similar to the operation shown in FIG. 6 in the first embodiment, but there are the following three differences. A first difference is that the access analysis device 1100 does not grasp the execution state of the content application but grasps the whole content of communication through the access analysis device 1100. A second difference is that the determination by the access source discrimination unit 1131 that determines whether or not the request source of the Internet connection request is a content application, is performed before operation of the access analyzer 231. A third difference is that not only an access request from the home video reproduction device 1200 but also a network file downloaded by the network file analyzer 1132 is the object of analysis.

Figure 23:
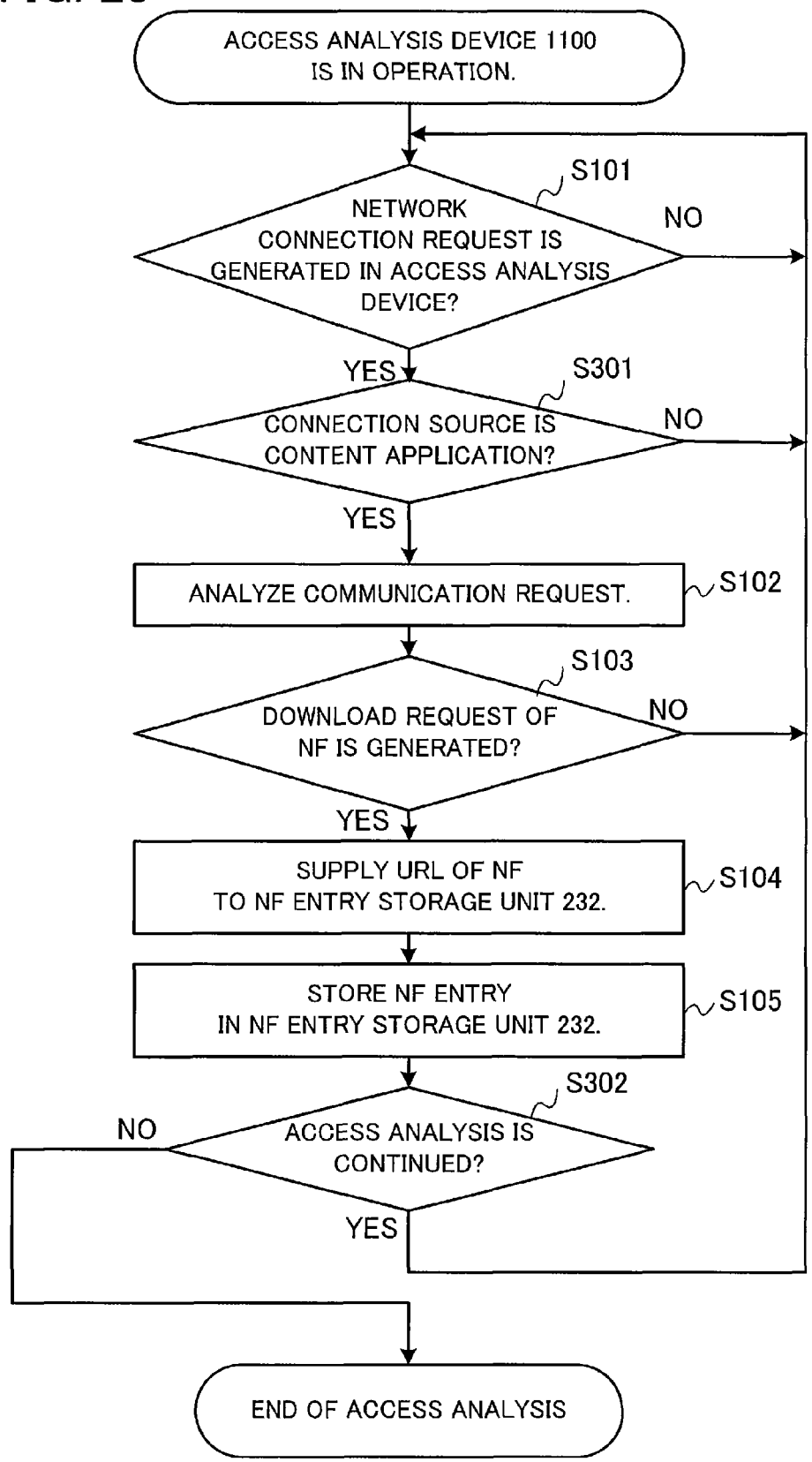
FIG. 23 is a flowchart showing processes of acquiring an NF entry from an Internet connection request, in the home video reproduction device (first information reproduction device) according to the fourth embodiment.

First, explanation is made about the flow of analyzing Internet access from the home video reproduction device 1200 and generating a network file entry with use of FIG. 23. FIG. 23 is a flowchart showing processes of acquiring an NF entry from an Internet connection request in the home video reproduction device (first information reproduction device) 1200 according to the fourth embodiment. In FIG. 23, the steps having the same processing content as the steps shown in FIG. 6 are denoted by the same reference characters as those shown in FIG. 6.

While the access analysis device 1100 is in operation, the access analysis device 1100 always waits for the generation of a network connection request to be given to the internal network connection unit 1133. When a communication request is given to the internal network connection unit 1133 (step S101), the communication request is given from the internal network connection unit 1133 to the external network connection unit 1134, and communication according to a request of a content application is performed. At the same time, the communication request is given also to the access source discrimination unit 1131.

The access source discrimination unit 1131 analyzes the content of the given Internet connection request (step S301), and if it is determined to be a connection request from a content application, gives it to the access analyzer 231 (step S102). If the access source discrimination unit 1131 determines that the Internet connection request is not a connection request from a content application, the access source discrimination unit 1131 discards it.

Whether or not the request source of the Internet connection request is a content application can be determined by using a code such as User-Agent included in the Internet connection request. Alternatively, the identification code on the network (IP address or the like) of the video reproduction device 1200 is stored beforehand in the access analysis device 1100, and a method of determining on the basis of this information whether or not the request source of the Internet connection request is a content application may be adopted.

If the result of analysis by the access analyzer 231 indicates that the content of the communication request is a download request of a network file (step S103), the URL of the network file is extracted from the content of the communication request and given to the NF entry storage unit 232 (step S105). The subsequent operation is the same as the operation (step S104, step S105) in FIG. 6, and the operation from step S101 is repeated as long as the operation of the access analysis device 1100 is continued (step S302).

Figure 24:
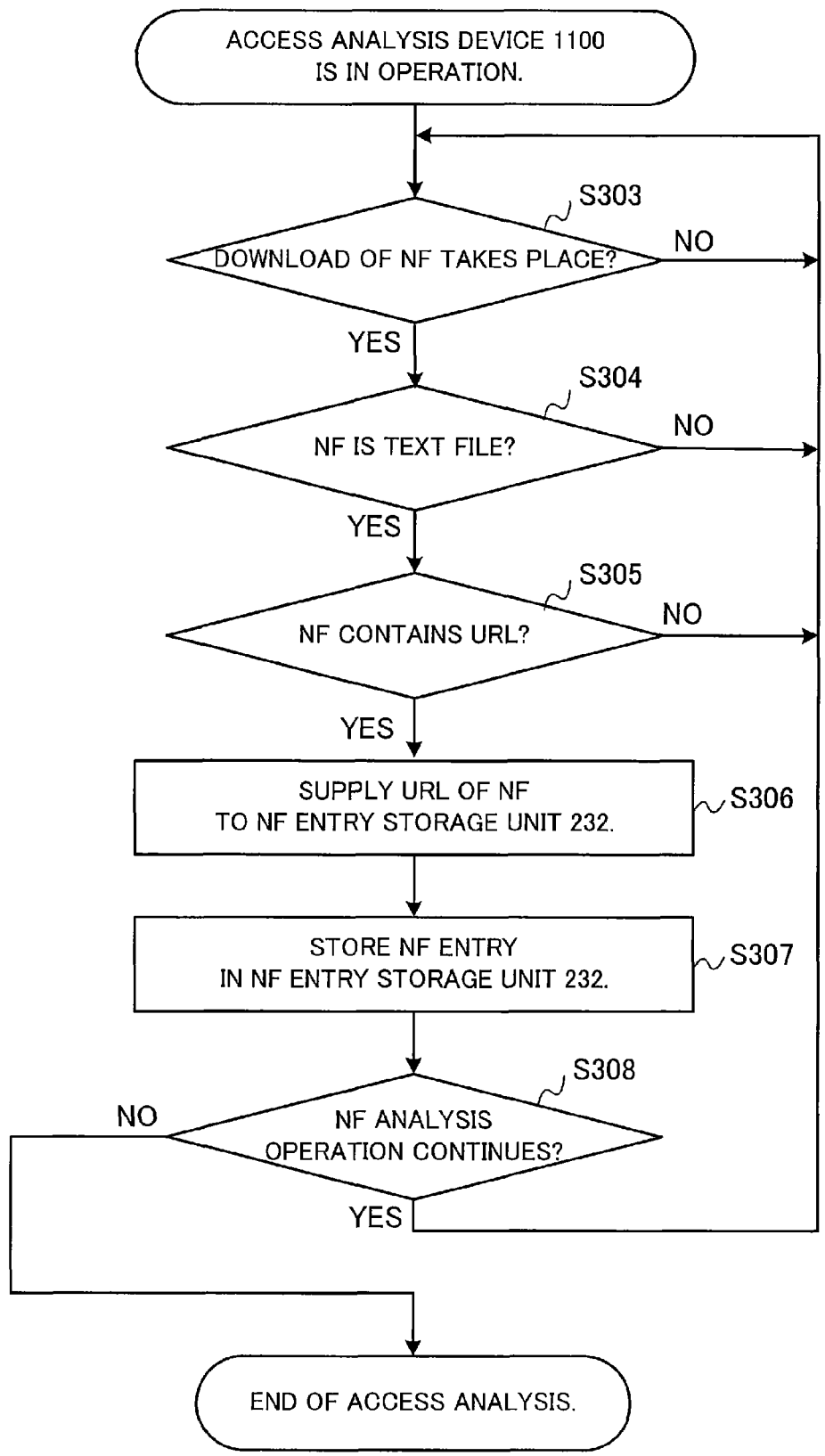
FIG. 24 is a flowchart showing processes of acquiring an NF entry from a downloaded NF, in the home video reproduction device (first information reproduction device) according to the fourth embodiment.

The operation of network file analysis will next be described with use of FIG. 24. FIG. 24 is a flowchart showing processes of acquiring an NF entry from a downloaded NF in the home video reproduction device (first information reproduction device) 1200 according to the fourth embodiment. While the access analysis device 1100 is in operation, the access analysis device 1100 always waits for the generation of network file downloading given from the external network connection unit 1134 (step S303). When the external network connection unit 1134 starts downloading of a network file, the downloaded network file is also given to the network file analyzer 1132, and its content is analyzed (step S304).

If the downloaded NF is a text file (step S304) and the URL of the file to be downloaded is contained within the NF, the network file analyzer 1132 extracts the URL from the NF and supplies it to the NF entry storage unit 232. The subsequent operation is the same as the operation (steps S306, S307) in FIG. 6 and FIG. 23, and as long as the operation of the access analysis device 1100 is continued, the operation from step S303 is repeated (step S308).

If the downloaded NF cannot be recognized as a text file in step S304, the network file analyzer 1132 discards the downloaded NF. If it is found in step S305 that the URL of the file to be downloaded is not contained within the NF, the network file analyzer 1132 discards the downloaded NF likewise.

The configuration and operation of the vehicle-mounted video reproduction device (second information reproduction device) 100 in FIG. 21 are the same as those in the first embodiment. In the fourth embodiment, the described items "transmission-reception unit 233 included in the home video reproduction device (first information reproduction device) 200" and "NF entry storage unit 232 included in the home video reproduction device (first information reproduction device) 200" in the first embodiment should be replaced by "transmission-reception unit 233 included in the access analysis device 1100" and "NF entry storage unit 232 included in the access analysis device 1100" respectively.

<4-3> Effects of Fourth Embodiment

As described above, according to the video reproduction system, video reproduction method, video reproduction device 100, and access analysis device 1100 according to the fourth embodiment, a system having the same effects as the first embodiment can be implemented just by adding the access analysis device to an existing home video reproduction device on the side of the NF entry supplier.

In the fourth embodiment, because an NFE only for an NF requested by the content application is generated due to the access source discrimination unit 1131, the vehicle-mounted video reproduction device (second information reproduction device) 100 is prevented from downloading an unnecessary NF for the content application, and the band usage efficiency can be improved.

In the fourth embodiment, because an NF entry is generated also for an NF for which the content application does not make a download request while the content application is running due to the network file analyzer 1132, the occasions that is able to reproduce an NF in the vehicle-mounted video reproduction device (second information reproduction device) 100 can be increased.

INDUSTRIAL APPLICABILITY

The present invention can be applied to a car navigation system, a personal computer, a television set, a portable BD player, and the like, which have a function of connecting with the Internet by wireless communication and a function of reproducing a portable information recording medium.

DESCRIPTION OF REFERENCE CHARACTERS 100 vehicle-mounted video reproduction device (second information reproduction device); 110 player unit (second player unit); 111 optical disc drive; 112 NF acquisition unit; 113 content reproduction unit; 114 reproduction control unit; 120 network connection unit (second network connection unit); 131 proxy response unit; 132 NF storage unit; 133 transmission-reception unit (second transmission-reception unit); 134 NF table storage unit; 134a NF table; 135 network-connection-state determination unit; 136 NF prior acquisition unit; 137 central controller (second central controller); 160, 260 input unit; 170, 270 monitor; 200 home video reproduction device (first information reproduction device); 210 player unit (first player unit); 211 optical disc drive; 212 NF acquisition unit; 213 content reproduction unit; 214 reproduction control unit; 220 network connection unit; 231 access analyzer; 232 NF entry storage unit; 233 transmission-reception unit (first transmission-reception unit); 234 central controller (first central controller); 300, 500 second vehicle-mounted video reproduction device (second information reproduction device); 400, 600 first vehicle-mounted video reproduction device (first information reproduction device); 700 the Internet; 900 optical disc (portable information recording medium); 1100 access analysis device; 1200 home video reproduction device (first information reproduction device); 1131 access source discrimination unit; 1132 network file analyzer; 1133 internal network connection unit; 1134 external network connection unit; 1220 network connection unit.

What is claimed is:

1. An information reproduction system comprising a first information reproduction device and a second information reproduction device that can communicate with each other, wherein:

the first information reproduction device includes:
a first network connection unit to make connection to the Internet;
a first player unit to reproduce a main content which is a reproduction target file recorded on a portable information recording medium and an additional content which is a network file acquired via the Internet;
an access analyzer to extract a network file entry as Internet connection destination information contained in an Internet connection request issued by executing a content application recorded on the portable information recording medium, when the portable information recording medium is reproduced in the first player unit;
a network-file entry storage unit to store the network file entry extracted by the access analyzer;
a first transmission-reception unit to transmit information through the first network connection unit; and
a first central controller to cause the first transmission-reception unit to transmit the network file entry stored in the network-file entry storage unit, when a network-file entry transmission request is received;

the second information reproduction device includes:
a second network connection unit to make connection to the Internet without use of the first network connection unit;
a second player unit to reproduce a main content which is a reproduction target file recorded on the portable information recording medium, and an additional content which is a network file acquired via the Internet;
a second transmission-reception unit to transmit and receive information through the second network connection unit;
a network-file table storage unit to store the network file entry as a network file table;
a second central controller to control a process of causing the second transmission-reception unit to transmit the network-file entry transmission request to the first information reproduction device, the second central controller performing a process of updating the network file table in the network-file table storage unit by using the network file entry transmitted from the first information reproduction device;

a network-file storage unit to store a network file; and a network-file prior acquisition unit to acquire the network file via the Internet through the second network connection unit, on a basis of the network file entry stored as the network file table and cause the network-file storage unit to store the acquired network file, the network file being acquired through the second network connection unit directly from the Internet without being routed through the first information reproduction device; and if it is determined that a network file entry included in an Internet connection request based on a content application recorded on the portable information recording medium exists in the network file table when the portable information recording medium is reproduced in the second player unit, the second central controller reads a network file identified by the network file entry which is determined to exist in the network file table, from the network-file storage unit, and supplies the network file to the second player unit.

2. The information reproduction system of claim 1, wherein, if it is determined that a network file entry included in an Internet connection request based on a content application recorded on the portable information recording medium does not exist in the network file table when the portable information recording medium is reproduced in the second player unit, the second central controller acquires a network file identified by the network file entry which is determined not to exist in the network file table, via the Internet, and supplies the network file to the second player unit.

3. The information reproduction system of claim 1, wherein:

the second network connection unit of the second information reproduction device further includes a network connection determination unit to determine whether or not communication with the Internet is possible; and when the network connection determination unit determines that the communication is possible, the second central controller causes to execute transmission of the network-file entry transmission request and acquisition of the network file by the network-file prior acquisition unit.

4. An information reproduction system comprising a first information reproduction device, an access analysis device, and a second information reproduction device that can communicate with each other, wherein:

the first information reproduction device includes:

a first network connection unit to make connection to the Internet through the access analysis device;

a network-file acquisition unit to acquire a file via the Internet through the first network connection unit; and a reproduction control unit to reproduce a main content which is a reproduction target file recorded on a portable information recording medium and an additional content which is a network file acquired via the Internet;

the access analysis device includes:

an internal network connection unit to accept an Internet connection from the first information reproduction device;

an external network connection unit to make connection to the Internet;

an access analyzer to analyze an Internet connection request and extract a network file entry as Internet connection destination information contained in the Internet connection request;

a network-file entry storage unit to store the network file entry extracted by the access analyzer;

a first transmission-reception unit to transmit information through the external network connection unit; and a first central controller, when a network-file entry transmission request is received, to cause the first transmission-reception unit to transmit the network file entry stored in the network-file entry storage unit;

the second information reproduction device includes:

a second network connection unit to make connection to the Internet without use of any of the first network connection unit and the external network connection unit;

a second player unit to reproduce a main content which is a reproduction target file recorded on the portable information recording medium and an additional content which is a network file acquired via the Internet;

a second transmission-reception unit to transmit and receive information through the second network connection unit;

a network-file table storage unit to store the network file entry as a network file table;

a second central controller to control a process of causing the second transmission-reception unit to transmit the network-file entry transmission request to the access analysis device, the second central controller performing a process of updating the network file table in the network-file table storage unit by using the network file entry transmitted from the access analysis device;

a network-file storage unit to store a network file; and a network-file prior acquisition unit to acquire the network file via the Internet through the second network connection unit, on a basis of the network file entry stored as the network file table, and cause the network-file storage unit to store the acquired network file, the network file being acquired through the second network connection unit directly from the Internet without being routed through any one of the first information reproduction device and the access analysis device; and if it is determined that a network file entry included in an Internet connection request based on a content application recorded on the portable information recording medium exists in the network file table when the portable information recording medium is reproduced in the second player unit, the second central controller reads a network file identified by the network file entry which is determined to exist in the network file table, from the network-file storage unit, and supplies the network file to the second player unit.

5. The information reproduction system of claim 4, wherein the access analysis device further includes an access source discrimination unit to determine whether a request source of an Internet connection request given to the internal network connection unit is a content application executed by the first information reproduction device, and performs access analysis only for a connection request, the request source of which is determined to be a content application by the access source discrimination unit.

6. The information reproduction system of claim 4, wherein the access analysis device
further includes a network-file analyzer to analyze the content of a network file given to the external network connection unit, and
if network connection destination information is obtained within the network file as a result of analysis of the network-file analyzer, extracts a network file entry on a basis of the network connection destination information.

7. An information reproduction method that is executed by a system including a first information reproduction device and a second information reproduction device that can communicate with each other, wherein:
each of the first information reproduction device and the second information reproduction device includes a first player unit and a second player unit to reproduce a main content of a reproduction target file recorded on a portable information recording medium and an additional content of a network file acquired via the Internet;
the information reproduction method comprises:
causing a network-file entry storage unit to store a network file entry as Internet connection destination information contained in an Internet connection request issued by executing a content application recorded on the portable information recording medium, when the portable information recording medium is reproduced in the first information reproduction device;
transmitting a network-file entry transmission request from the second information reproduction device to the first information reproduction device;
transmitting the network file entry stored in the network-file entry storage unit, from the first information reproduction device which has received the network-file entry transmission request, to the second information reproduction device;
in the second information reproduction device which has received the network file entry, causing a network-file table storage unit to store the received network file entry as a network file table;
in the second information reproduction device, acquiring a network file via the Internet on a basis of the network file entry stored in the network-file table storage unit and causing a network-file storage unit to store the acquired network file, the network file being acquired by the second information reproduction device directly from the Internet without being routed through the first information reproduction device; and
if it is determined that a network file entry corresponding to a reproduction target file recorded on the portable information recording medium exists in the network file table when the portable information recording medium is reproduced in the second player unit, executing a proxy response for reading a network file identified by the network file entry corresponding to the reproduction target file from the network file storage unit, and for supplying the network file to the second player unit.

8. The information reproduction method of claim 7, comprising, if it is determined that a network file entry corresponding to a reproduction target file recorded on the portable information recording medium does not exist in the network file table when the portable information recording medium is reproduced in the second player unit, acquiring via the Internet a network file identified by a network file entry included in an Internet connection request based on a content application recorded on the portable information recording medium and supplying the network file to the second player unit.

9. The information reproduction method of claim 7, wherein the second information reproduction device executes transmission of the network-file entry transmission request and acquisition of the network file when communication with the Internet is possible.

10. An information reproduction method that is executed by a system including a first information reproduction device, an access analysis device, and a second information reproduction device that can communicate with each other, wherein:
each of the first information reproduction device and the second information reproduction device includes a first player unit and a second player unit to reproduce a main content of a reproduction target file recorded on a portable information recording medium and an additional content of a network file acquired via the Internet;
the information reproduction method comprises:
transmitting an Internet connection request in the first information reproduction device through the access analysis device to the Internet;
in the access analysis device, causing a network-file entry storage unit to store a network file entry as Internet connection destination information contained in an Internet connection request;
transmitting a network-file entry transmission request from the second information reproduction device to the access analysis device;
transmitting the network file entry stored in the network-file entry storage unit, from the access analysis device which has received the network-file entry transmission request, to the second information reproduction device;
in the second information reproduction device which has received the network file entry, causing a network-file table storage unit to store the received network file entry as a network file table;
in the second information reproduction device, acquiring a network file via the Internet on a basis of the network file entry stored in the network-file table storage unit and causing a network-file storage unit to store the acquired network file, the network file being acquired by the second information reproduction device directly from the Internet without being routed through the first information reproduction device and the access analysis device; and
if it is determined that a network file entry corresponding to a reproduction target file recorded on the portable information recording medium exists in the network file table when the portable information recording medium is reproduced in the second player unit, executing a proxy response for reading a network file identified by the network file entry corresponding to the reproduction target file from the network-file storage unit and for supplying the network file to the second player unit.

11. The information reproduction method of claim 10, further comprising, in the access analysis device, performing access analysis only on a connection request in which a request source of an Internet connection request given to the access analysis is determined to be a content application.

12. The information reproduction method of claim 10, further comprising, if, as a result of analysis of a downloaded network file, network connection destination information is obtained within the network file, in the access analysis device, extracting a network file entry on a basis of the network connection destination information.

13. An information reproduction device that can communicate with another information reproduction device, the information reproduction device comprising:
- a player unit to reproduce a main content which is a reproduction target file recorded on a portable information recording medium and an additional content which is a network file acquired via the Internet;
- a network connection unit to make connection to the Internet without use of the another information reproduction device;
- a transmission-reception unit to transmit a network-file entry transmission request through the network connection unit to the another information reproduction device;
- a network-file table storage unit to store a network file entry as a network file table;
- a central controller to control a process of causing the transmission-reception unit to transmit the network-file entry transmission request to the another information reproduction device, the central controller performing a process of, when the transmission-reception unit receives the network file entry, updating the network file table by using the received network file entry;
- a network-file storage unit to store a network file; and
- a network-file prior acquisition unit to acquire the network file on a basis of the network file entry stored in the network-file table storage unit, via the Internet through the network connection unit, and cause the network-file storage unit to store the acquired network file, the network file being acquired through the network connection unit directly from the Internet without being routed through the another information reproduction device;

wherein the central controller
causes the network-file table storage unit to store the network file entry which is received by the transmission-reception unit and extracted as Internet connection destination information contained in an Internet connection request, the Internet connection request being issued by the another information reproduction device that is executing a content application recorded on the portable information recording medium when the portable information recording medium is reproduced by the another information reproduction device, and
includes a proxy response unit, if it is determined that a network file entry corresponding to a reproduction target file recorded on the portable information recording medium exists in the network file table when the portable information recording medium is reproduced in the player unit, to read a network file identified by the network file entry corresponding to the reproduction target file from the network-file storage unit, and supply the network file to the player unit.

14. The information reproduction device of claim 13, further comprising:
- an access analyzer to extract a network file entry as Internet connection destination information contained in an Internet connection request issued by executing a content application recorded on the portable information recording medium, when the portable information recording medium is reproduced in the player unit;
- a network-file entry storage unit to store the network file entry extracted by the access analyzer; and
- another transmission-reception unit to transmit the extracted network file entry through the network connection unit.

15. The information reproduction device of claim 14, wherein the information reproduction device can be also used as the another information reproduction device.

16. The information reproduction device of claim 13, further comprising an access analyzer to extract a network file entry as Internet connection destination information contained in an Internet connection request issued by executing a content application recorded on the portable information recording medium, when the portable information recording medium is reproduced in the player unit, and cause the network-file table storage unit to store the network file entry;
wherein the transmission-reception unit transmits the extracted network file entry through the network connection unit.

17. The information reproduction device of claim 13, wherein the information reproduction device is a video reproduction device which can be used while on the move, and the another information reproduction device is set up and used in a predetermined position.

18. The information reproduction device of claim 13, wherein the information reproduction device is a video reproduction device which can be used while on the move, and the another information reproduction device is a video reproduction device which can be used while on the move.

19. The information reproduction device of claim 13, wherein the portable information recording medium is an optical disc.

* * * * *